US008886794B2

(12) United States Patent
Adnani et al.

(10) Patent No.: US 8,886,794 B2
(45) Date of Patent: Nov. 11, 2014

(54) SYSTEM AND METHOD FOR DETECTING RF TRANSMISSIONS IN FREQUENCY BANDS OF INTEREST ACROSS A GEOGRAPHIC AREA

(75) Inventors: Nikhil Adnani, Ottawa (CA); Tim Hember, Ottawa (CA)

(73) Assignee: ThinkRF Corporation, Ottawa (CA)

(*) Notice: Subject to any disclaimer, the term of this patent is extended or adjusted under 35 U.S.C. 154(b) by 134 days.

(21) Appl. No.: 13/013,892

(22) Filed: Jan. 26, 2011

(65) Prior Publication Data
US 2011/0185059 A1    Jul. 28, 2011

Related U.S. Application Data

(60) Provisional application No. 61/298,971, filed on Jan. 28, 2010.

(51) Int. Cl.
*G06F 15/173* (2006.01)
*H04W 24/08* (2009.01)
*H04W 84/18* (2009.01)
*H04W 84/12* (2009.01)

(52) U.S. Cl.
CPC ............ *H04W 24/08* (2013.01); *H04W 84/18* (2013.01); *H04W 84/12* (2013.01)
USPC .......................................... 709/224; 370/338

(58) Field of Classification Search
USPC .......................................... 709/224; 370/338
See application file for complete search history.

(56) References Cited

U.S. PATENT DOCUMENTS

| 5,103,402 | A * | 4/1992 | Morton et al. ............... 702/76 |
| 5,303,262 | A | 4/1994 | Johnson |
| 7,142,108 | B2 * | 11/2006 | Diener et al. .............. 340/539.1 |
| 7,167,513 | B2 | 1/2007 | Tsui |
| 7,184,777 | B2 * | 2/2007 | Diener et al. .............. 455/456.1 |
| 7,224,752 | B2 | 5/2007 | Sugar |
| 7,251,577 | B2 * | 7/2007 | Bernard et al. ............... 702/124 |
| 7,418,357 | B2 | 8/2008 | Bernard |
| 8,112,238 | B1 * | 2/2012 | Gorin ........................... 702/107 |
| 2002/0135834 | A1 * | 9/2002 | Hill et al. ...................... 359/110 |
| 2004/0047324 | A1 * | 3/2004 | Diener ......................... 370/338 |

(Continued)

OTHER PUBLICATIONS

MacNeil et al. Dec. 23, 2009. "Behavior of clock sampling mutual network synchronization in wireless sensor networks: convergence and security". Retrieved on Jul. 8, 2013. Retrieve from <http://onlinelibrary.wiley.com/doi/10.1002/wcm.905/abstract>.*

(Continued)

*Primary Examiner* — Kamal Divecha
*Assistant Examiner* — Juan C Turriate Gastulo
(74) *Attorney, Agent, or Firm* — Rosenberg, Klein & Lee

(57) ABSTRACT

Wireless devices form a significant portion of equipment forming the source/destination of content transmitted over telecommunications infrastructure together with applications such as RF identification, smart tags, etc. As such the wireless spectrum supports these devices operating to multiple standards, both licensed and unlicensed. In many environments it would be beneficial for a network administrator to know whether the environment and network they are responsible for is compliant to policies established in dependence of the environment/network. The invention provides distributed wireless signal analyzers within the environment/network to provide signal/spectrum analysis and determine whether received signals by the wireless signal analyzer are compliant to the network administrator policy. Compliance may be based upon time or frequency domain measurements with different rules for different wireless spectrum regions. Non-compliance is communicated to remote servers and/or network administrator and allows local control of network equipment.

19 Claims, 12 Drawing Sheets

(56) References Cited

U.S. PATENT DOCUMENTS

| 2008/0222021 | A1* | 9/2008 | Stanforth et al. | 705/37 |
|---|---|---|---|---|
| 2009/0046625 | A1* | 2/2009 | Diener et al. | 370/319 |
| 2009/0149208 | A1* | 6/2009 | Huttunen et al. | 455/509 |
| 2009/0181636 | A1* | 7/2009 | Fulks et al. | 455/334 |
| 2009/0274073 | A1* | 11/2009 | Sutton | 370/280 |
| 2010/0272166 | A1* | 10/2010 | Nara | 375/224 |

OTHER PUBLICATIONS

MacNeil et al. Dec. 23, 2009. "Behavior of clock sampling mutual network synchronization in wireless sensor networks: convergence and security". Retrieved on Jul. 8, 2013, from <http://onlinelibrary.wiley.com/doi/10.1002/wcm.905/abstract>.*

ThinkRF, 2014. "The ThinkRF Wireless Signals Intelligence Platform." Retrieved on Jun. 23, 2014, from <http://thinkrf.com/oldsite/solution.html>.*

O. Myllari et al. "Digital Transmitter I/Q Imbalance Calibration: Real-time Prototype Implementation and Performance Measurement" (18th Eur. Sig, Processing Conf., Aug. 2010, pp. 537-541).

G. Fettweis et al. "Dirty RF: A New Paradigm" (International Journal of Wireless Information Networks, vol. 14, No. 2, Jun. 2007, pp. 133-148).

* cited by examiner

SYSTEM AND METHOD FOR DETECTING RF TRANSMISSIONS IN FREQUENCY BANDS OF INTEREST ACROSS A GEOGRAPHIC AREA

CROSS-REFERENCE TO RELATED APPLICATIONS

This application claims benefit of priority to U.S. patent application Ser. No. 61/298,971 filed Jan. 28, 2010 entitled "System and Method for Detecting RF Transmissions in Frequency Bands of Interest Across a Geographic Area".

FIELD OF THE INVENTION

This invention relates to wireless signal analysis and more specifically to distributed real-time monitoring over a geographical area and establishing wireless event triggers.

BACKGROUND OF THE INVENTION

Wireless communication is ubiquitous and deployments are growing rapidly. In 2008 the International Telecommunication Union estimated the number of mobile telephones at 4.1 billion with a worldwide population of approximately 6.8 billion people (ITU Corporate Annual Report, http://www.itu.int/dms_pub/itu-s/opb/conf/S-CONF-AREP-2008-E06-PDF-E.pdf). Portio Research estimates the number of mobile telephones will grow to 5.8 billion by 2013, fueled by Asia-Pacific particularly, which by 2013 will account for 43.9 percent of subscribers, followed by Europe (25.0 percent), Africa and Middle East (12.2 percent), Latin America (11.2 percent) and North America (7.6 percent) ("Mobile Factbook 2009" http://www.portiodirect.com/productDetail.aspx?pid=49$55$51$431). By 2014, global mobile Internet users expected to send and receive 1.6 Exabytes of mobile data each month, which is more than the 1.3 Exabytes transferred during the whole of 2008, according to ABI Research (http://www.abiresearch.com/press/1466-In+2014+Monthly+Mobile+Data+Traffic+Will+Exceed+2008+Total).

Cellular phones are evolving into hand-held computers with voice, data and video multimedia applications and accordingly, there is the associated increasing demand for more bandwidth. IDC estimates the annual shipment of Bluetooth-enabled devices as 1.2 billion devices and growing with 20% CAGR (http://www.idc.com/getdoc.jsp?sessionId=&containerId=219098&sessionId=UDMGOJ2XGTN JMC-QJAFICFGAKBEAUMIWD). In-Stat estimates the annual shipment of WLAN-enabled devices is 380 million and growing 24% CAGR ("Global Wi-Fi Chipset Forecast and Analysis: 2007 to 2013" http://www.instat.com/abstract.asp?id=167&SKU=IN0904005WS). Additionally, the cost of deploying a wireless system is decreasing by half compounded every five years (The Economist, Apr. 10, 2008).

By contrast wireless spectrum is a scarce and limited resource allocated in small segments for many different communication uses (see for example www.ntia.doc.gov/osmhome/allochrt.pdf). The recent auction of spectrum in the US provides a good indication of spectrum scarcity and resulting value. In 2008, the US Federal Communications Commission (FCC) auctioned a relatively tiny 62 MHz segment of spectrum across the United States for a total of US$19.6B (http://wireless.fcc.gov/auctions/default.htm?job=auction_summary&id=73) to a collection of telecommunications service providers including Verizon and AT&T. This spectrum was made available as a result of the digital television (DTV) transition away from analog TV (http://en.wikipedia.org/wiki/United_States_2008_wireless_spectrum_auction). To satisfy the increasing demands for performance and throughput, wireless physical layer designs are becoming increasingly complex. It has been nearly thirty years since the first commercial wireless network using frequency division multiple access, so-called 1G technology was developed. Next came time division multiple access (TDMA) in 2G Global System for Mobile Communications (GSM) systems in the 1990s followed by code division multiple access (CDMA) in 3.xG systems in the early 2000s. 4G networks of Long Term Evolution (LTE) and WiMax are currently in the planning and deployment stages and the next generation wireless local area network (LAN) 802.11n systems are pushing throughput towards 100 Mbps with Multiple-Input-Multiple-Output (MIMO) and orthogonal frequency division multiple access (OFDMA) approaches. Such modern wireless communication systems employ sophisticated RF technologies that include frequency hopping, complex modulation and packet-based transmission formats. These new data-centric wireless systems are complex to deploy, operate, maintain and monitor.

Wireless communications is becoming increasingly subjected to radio interference. As the density of wireless devices increases so does the density of wireless base stations. To satisfy a city of millions of cellular users, each with increased cellular usage, requires a progressively denser mesh of cellular base stations, and these increasingly interfere with each other. Simultaneously corporations are increasingly deploying or expanding wireless networks. Wireless 802.11 LAN occupies the same spectrum as Bluetooth, cordless phones and microwave ovens and "must accept any interference" (en.wikipedia.org/wiki/ISM_band). In addition to these sources of unintentional interference there is the issue of RF devices transmitting with malicious intent. Radio jamming for instance refers to the transmission of RF signals that disrupt communication networks by decreasing the signal-to-interference ratio.

The rapid growth of deployments, scarcity of spectrum, complexity of solutions, congestion and interference are increasingly compounded problems for those deploying, managing, maintaining and monitoring wireless services. Wireless spectrum is a shared resource. Worldwide national governments not only license the use of the spectrum but must also police that spectrum. Policing ensures that those who are not authorized are not transmitting and those who have spent billions of dollars for licensing have unencumbered access. Specifically, government agencies monitor the wireless spectrum within their countries to determine the occupancy within specific segments of the spectrum, to enforce allocation and to police issues pertaining to interference. Currently, these agencies typically deploy laboratory or hand-held spectrum analyzers that are expensive and not designed for remote deployment. Consequently they are required to maintain and deploy expensive personnel and equipment to monitor wireless activity within their network, which can as a result be intermittent in nature.

Wireless communications and networks are deployed by telecommunications service providers, governments, corporations and the home user. Service providers are challenged by the compounding problems of increased number and density of users, increased user usage, and demands for increased bandwidth. The deployment, operation and maintenance of next generation wireless services are as a result increasing the demands for test, monitoring and "visibility" of the wireless physical layer. Similar to government agencies, service providers currently must deal with deployment issues by similarly maintaining and deploying expensive personnel and equipment to at best accomplish intermittent and often inadequate monitoring.

Corporate and government information technology (IT) groups face similar if not worse problems in the deployment, operation and maintenance of wireless networking infrastructure. The suite of IEEE 802.11 wireless products operate in unlicensed frequency bands. As a result, wireless LANs face interference from the deployment of not only other wireless LANs but also other wireless devices such as Bluetooth devices, cordless phones and even microwave ovens. So the IT departments are faced with not only the increasing demand for density and bandwidth, but also interference from a broad range of sources which may be transitory in nature and agile in frequency.

In addition to ensuring wireless connectivity, preventing wireless connectivity has also become an issue. A growing segment of large corporate and government departments for example require the enforcement of a no-wireless policy. A no-wireless policy is intended to prevent for example the inadvertent or malicious listening of sensitive, proprietary, confidential or secret information within meeting rooms via a cell phone or an eavesdropping device. Such policy enforcement is challenged by the breadth and complexity of wireless devices, which are evolving rapidly in terms of functionality, complexity and performance.

Applications for spectrum monitoring also extend to other environments, for example the battlefield. Equipping military personnel with the means to monitor and analyze their RF environment for communication activity, signal jammers and other threats is becoming a necessity in today's world of ubiquitous wireless devices, improvised explosive devices with remote triggers, etc.

Accordingly there exists an increasing demand for real-time monitoring of the wireless environment across extended geographical areas. It is not sufficient for example to simply monitor at a discrete location within a hospital, it should be all over the hospital, nor is it sufficient to monitor at specific locations within an urban environment as increasingly the wireless infrastructure moves from large cell structures to picocells and femtocells. The applications of such real-time distributed analysis included interference detection, no-wireless or selective-wireless policy enforcement, spectrum management, signals intelligence (SIGINT), communications intelligence (COMINT), electronic intelligence (ELINT) and signal/interference analysis. In respect of policy enforcement this may be over a discrete area such as a shop, a floor of an office building for example or a large area such as an enterprise environment, a mall, a downtown business district, an airport, hospital or other geographically distributed environment.

For illustrative purposes of a selective wireless policy implementation a network administrator may allow signal transmissions with specified maximum amplitude characteristics in different frequency bands. At the same time transmissions in some frequency bands are prohibited and the specifications of allowed frequency bands may also vary from one geographic area of the enterprise to another. The requirement is to detect any violation in this policy and inform the network administrator of the breach as soon as it occurs. It would be apparent that many such selective wireless policies might exist.

Today wireless signal analysis is typically performed only in laboratory environments or with very limited, customized field applications. This arises from consideration of the availability of test equipment, which is generally large, expensive microwave test equipment, from companies such as Agilent, Tektronix, Anritsu, Ando, etc, allowing measurements and analysis over a wide frequency spectrum, for example 0 MHz-6000 MHz (6 GHz) rather than specific application test equipment addressing a particular niche market with limited functionality and limited frequency range, e.g. the portable tester a cable engineer comes to a residence with that only needs to address a 83 MHz range for IEEE 802.11b WiFi applications. Wireless, RF and microwave applications range within the United States are covered by the FCC regulations up to 300 GHz (see http://www.ntia.doc.gov/osmhome/allochrt.html for allocations) but for the limitation of discussions within this document applications to an upper limit of 6 GHz are considered for explanation purposes only.

Accordingly it would be beneficial to provide low cost signal analyzers with broadband performance allowing them to be deployed across a geographic area or within a predetermined region. It would be further beneficial if the signal analyzers communicated with a centralized remote server allowing an overall picture of the wireless activity within an area to be ascertained, tracked and monitored. Early work in addressing this requirement, see for example S. R. Morton et al in U.S. Pat. No. 5,103,402 entitled "Method and Apparatus for Identifying, Saving, and Analyzing Continuous Frequency Domain Data in a Spectrum Analyzer", considered how to handle data accumulated at a rate faster than real-time display means and hence approached the issue by continuously storing the scanned spectra into a memory for subsequent retrieval and display as a surface plot rather than the normal amplitude versus frequency plot. However, such methods merely addressed the ability of conventional spectrum analyzers, upon which the methods were based, to accumulate date faster than a user could review.

More recent work by Cognio Inc., now part of Cisco Systems Inc., has considered signal analysis for determining whether to jam an unauthorized transmission occurring within a predetermined region, see for example N. R. Diener et al in U.S. Pat. No. 7,142,108 entitled "System and Method for Monitoring and Enforcing a Restricted Wireless Zone" (hereinafter referred to as Diener '108). Diener '108 teaches that at each location within the predetermined region a spectrum monitoring section analyses all activity within a narrow predetermined band, e.g. 2.400-2.483 GHz ISM, 5.725-5.825 GHz Upper U-NII (U-NII-3) band for, based upon applying a Fast-Fourier Transform (FFT) to received pulsed signals with multiple FFT intervals to determine a power versus frequency plot. This data is then sent, using a different frequency range and transmission standard, to a central server for every cycle of the FFT process along with additional information derived from a co-hosted traffic monitoring station that operates using International standard protocols, such as IEEE 802.11, to generate probe requests and receive responses allowing legitimate traffic to be identified or transmitting nodes operating according to the International standard to be located. However, Diener '108 requires that a large amount of information is continuously transmitted (wirelessly) from the monitoring nodes to the server for analysis, irrespective of whether the information transmitted is about legitimate sources or otherwise.

A similar system is presented by N. R. Diener et al in U.S. Pat. No. 7,184,777 entitled "Server and Multiple Sensor System for Monitoring Activity within a Shared Radio Frequency Band" (hereinafter referred to as Diener '777) which omits the jamming elements within the remote nodes of Diener '108. Diener '777 addresses the identification of non-standard transmitters operating in the same frequency band as a wireless LAN (WLAN) within an enterprise. As with Diener '108 Diener '777 considers these signal analyzers to be targeted to a specific telecommunications standard and narrow frequency range, such as monitoring and analyzing an IEEE 802.11 (WiFi) WLAN, e.g. operating at the 5.725-5.825 GHz Upper U-NII (U-NII-3) band, and continuously streams spectrum measurement data to the central server via wireless links according to another wireless standard which may or may not be retrieved for subsequent review. Non-standard transmitters according to Diener '777 are determined by the co-hosted traffic monitoring station that operates using same standard protocol as the WLAN and it is these spectrum measurements that Diener '777 teaches as being viewed.

Each of Diener '108 and Diener '777 utilize a real-time spectrum analysis engine (SAGE) as described by G. L. Sugar et al in U.S. Pat. No. 7,224,752 entitled "System and Method for Real-Time Spectrum Analysis in a Communication Device" which is a hardware accelerator implemented in standard CMOS electronics to determine information about pulses occurring within the predetermined frequency range of the SAGE. As such the SAGE generates continuously data such as start time, duration, power, center frequency and bandwidth of signals detected within the local region of the antenna feeding the SAGE. As noted supra in respect of Diener '108 and Diener '777 the SAGE has a bandwidth of approximately 100 MHz as the applications are specific network applications such as the monitoring of a WLAN on a single floor within an office building. The centralized management taught by Diener '108 and Diener '777 receives the continuous stream of power/frequency data and presents this data to the central manager for determination of action.

However, today multiple networks are operating simultaneously within the environment of a user who may for example be working at their laptop with a WiFi wireless router (e.g. 5.775 GHz U-NII-3 based IEEE 802.11) interfaced to the Internet whilst talking using a Bluetooth (unlicensed 2.4 GHz) headset to a Voice-over-IP (VOIP) with their Research in Motion™ Blackberry operating at 1.9 GHz on GSM. Accordingly it would be beneficial to cost-effectively monitor geographical areas for signal activity within multiple frequency bands managed by a network and communicate notifications of policy breaches to the administrator whilst also providing direct local signaling which may be used to adjust an operational aspect of the signal analyzer or wireless environment. Accordingly each signal analyzer according to embodiments of the invention only transmits to the central management systems in the event of a policy breach, the policy breach may be specific to that signal analyzer or associated with a predetermined portion of the network. Should communications to the central server systems be interrupted the local policy management allows devolved processing, decision-making and local caching of data.

A policy breach can lead to subsequent action by the central server to initiate signal analysis operations. For example, relevant data is streamed from the signal analyzer to the server and further processed for message content. A system of priority may be assigned whereby this data stream is processed with greater urgency than data streams from other analyzers.

It is, therefore, desirable to provide low cost, broadband signal analysis in a distributed environment wherein determination of policy breaches are locally determined and communicated to the central server and network administrators. Beneficially such local determination reduces communication overheads across the network and permits local action to be taken in the event of communications failure. The benefits of an automated system of notification are many, for example, the administrator does not have to manually, continuously monitor spectral data to determine if a breach has occurred.

SUMMARY OF THE INVENTION

It is an object of the present invention to obviate or mitigate at least one disadvantage of the prior art.

In accordance with an embodiment of the invention there is provided at least one signal analyzer of a plurality of signal analyzers, each signal analyzer associated with a predetermined location and for providing spectral analysis of at least one user-specified frequency band of a plurality of user-specified frequency bands to determine whether signals by the at least one signal analyzer within the at least one user-specified frequency band comply with at least a user-defined policy of a plurality of user-defined policies and at least one server of a plurality of servers, each server in communication with a predetermined subset of the plurality of signal analyzers to receive a triggered signal from a signal analyzer within the predetermined subset when signal analysis denotes a predetermined condition with respect to compliance of received signal to the at least one user-defined policy.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 9 depicts the Transmit Spectrum Mask according to IEEE 802.11a;

DETAILED DESCRIPTION

Figure 1:
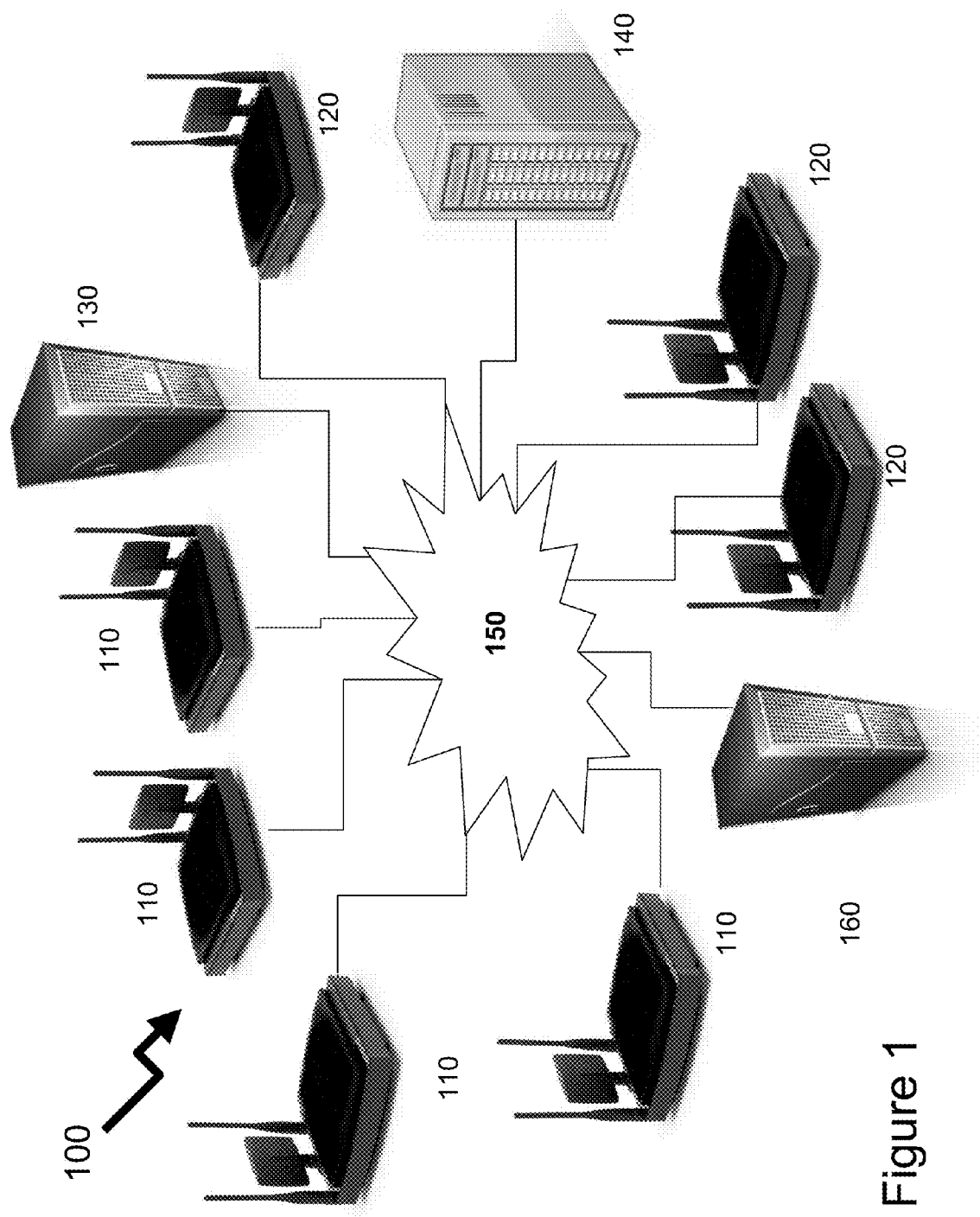
FIG. 1 is a block diagram of an embodiment of the invention depicting a distributed system of signal analyzers connected to remote servers.

The present invention is directed to detecting and analyzing time-varying wireless signals across geographic areas and communicating record of policy breaches efficiently to a central server. Local analysis allows the amount of data transferred across the network to the remote servers to be reduced as well as permitting local action should it be necessary through communications failures for example. It also enables automated and real-time response from the servers to initiate processing on the detected signal. Examples of such processing on the signal analyzers might involve filtering and decimation to focus in on the signal of interest and enable narrowband streaming of data across the network. According to an embodiment of the invention a direct-conversion radio receiver with a digital signal processing system is used to capture and sample or digitize wireless signal transmissions. Sampled data may then be analyzed directly or transformed to the frequency domain and then analyzed. If signal activity that meets predetermined user-defined criteria is detected it constitutes a policy breach. A record of this activity is processed within the signal analyzer and results of the processing and associated data are communicated to the central server. As a result since most of the trigger analysis is performed within the signal analyzer it alleviates any wireless or wireline network data throughput bottlenecks that might occur if this processing were to be done in the central server. This latter situation requires that the raw digitized data from the multiple signal analyzers be streamed to the central server which in the event of significant numbers of signal analyzers operating on multiple bands with geographically varying policies places significant overhead on the network interfaces between the signal analyzers and central server and the processing functions at the central server.

In the case that the range of frequencies being monitored instantaneously increases, the volume of data to be streamed to the central server increases. Any bottleneck or network outage encountered thereby limits effective or reliable signal monitoring. Embodiments of the invention alleviate this by reducing the amount of data to be transmitted for increased reliability of signal monitoring as well as allowing local control or adjustment of the wireless network. Upon receipt of a record of signal activity at the central server it may be stored for subsequent retrieval/analysis or employed in determining if action is required automatically or by the network administrator. In such cases the analysis application executing on the central server or associated processor may automatically take action in respect of the network if no local action has been enabled or the local action has not corrected an issue within the network. Alternatively the application may be configured to notify the network operator on his/her cellular phone, laptop, terminal or any other mobile device for example.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

The present invention pertains to a system and method for detection, analysis and monitoring of time-varying wireless signals having either known, certain known or completely unknown transmission parameters in a range of applications including for example buildings, urban environments, across geographic areas and across either narrowband, broadband or wideband spectra. Examples of such transmission parameters include but are not limited to modulation, duty cycle, centre frequency, bandwidth and power level. In such applications the use of a single piece of signal detection equipment, such as described supra in respect of the prior art of Morton being a laboratory spectrum analyzer is inadequate for monitoring on account of the fact that it has a finite listening range determined by its dynamic range and the characteristics of the network. In other words signal transmissions from sources that are located beyond a certain maximum distance from the analyzer cannot be detected wherein this maximum distance is determined by the transmitted power level, frequency of operation, propagation environment and other parameters.

Referring to FIG. 1 there is depicted an embodiment of the invention for a monitoring network 100 using a network of spatially separated, field-deployable, cost-effective first wireless signal analyzers (WSAs) 110 that monitor signals across a geographic area. Each first WSA 110 has a finite listening range while the network of WSAs is arranged so that a transmitted signal should be detected by at least one first WSA 110. Each first WSA 110 is connected over a network 150 to a first central server 130. The network may be wired, optical, wireless or a combination of all. Data stored within the first central server 130 may be optionally mirrored to a core server 140. A user, for example the network administrator specifies the frequency bands of interest and a range of trigger criteria in either the time and/or frequency domain which is communicated to the network of spatially separated, field-deployable, cost-effective first WSAs 110. Each of the first WSAs 110 follows a frequency sweep plan to monitor these bands.

Within these bands if signal activity that meets user-defined criteria is detected it constitutes a policy breach. A record of signal activity in either the time or frequency domain and/or pertinent signal characteristics are communicated back to the first central server 130 associated with the spatially separated, field-deployable, cost-effective first WSAs 110. Signal characteristics that may form part of trigger criteria may include modulation, duty cycle, time duration, centre frequency, bandwidth and power level. Each record is time-stamped and contains pertinent information such as geographic co-ordinates and serial number to identify the first WSA 110 within the monitoring network 100 that recorded and transmitted the information. As discussed supra by transmitting data only upon a trigger event and not transmitting any data in the absence of a trigger, the system utilizes the monitoring network bandwidth efficiently. Beneficially the monitoring network 100 can be scaled easily. In other words, first WSAs 110 can be added to the monitoring network 100 for denser deployments without significantly impacting data throughput across the network. Also shown are second WSAs 120 which are similarly deployed across the network. Second WSAs 120 may for example be configured to scan a different frequency range to the first WSAs 110 that may or may not overlap. Alternatively second WSAs wireless signal analyzers 120 may be associated with a particular geographic zone of the network. Further the second WSAs may communicate events to either the first central server 130 or may communicate with a second central server 160 that is different to that to which the first WSAs 110 report.

Accordingly it would be evident to one skilled in the art that the first and second central servers 130 and 160 respectively may be similarly distributed according to the density of signal analyzers or other criteria. Further network management may be distributed allowing analysis to be performed at the first and second central servers 130 and 160 respectively for that portion of the network or networks to which monitoring network 100 is associated. Decisions executed at the first and second central servers 130 and 160 respectively may also be communicated to the core server 140 for logging, verification, and adjustment. Alternatively the network or networks may be controlled from the core server 140 only. Partitioning, however, as would be evident to one skilled in the art provides for a graceful degradation in network control under network outage or failures.

The first and second WSAs 110 and 120 respectively are each an electronic system consisting of a direct-conversion receiver, digitizer and hardware for interfacing to the network 150. First and second WSAs 110 and 120 may be the same WSA design configured according to the portion of the network 100 they are monitoring or different designs optimized for cost-performance according to the portion of the network they are monitoring. Accordingly first and second WSAs 110 and 120 may be collocated but addressing different requirements, for example one monitors the 0-6 GHz range whilst another the 57-64 GHz range for ultra wideband (UWB) wireless personal area networks according to IEEE 802.15.3c-2009 for data rates up to 2 Gb/s. In communicating to the network 150 the WSAs may contain interfaces for either wired, wireless, or optical networks alone or in combination. Additionally the WSA may be housed with a global positioning system module, not shown for clarity, and optionally housed alone within a mechanical closure for deployment in indoor or outdoor environments or in combination with network infrastructure such as a base station, wireless cellular network tower etc. Alternatively it may be embedded within or be part of a communications device.

Figure 2:
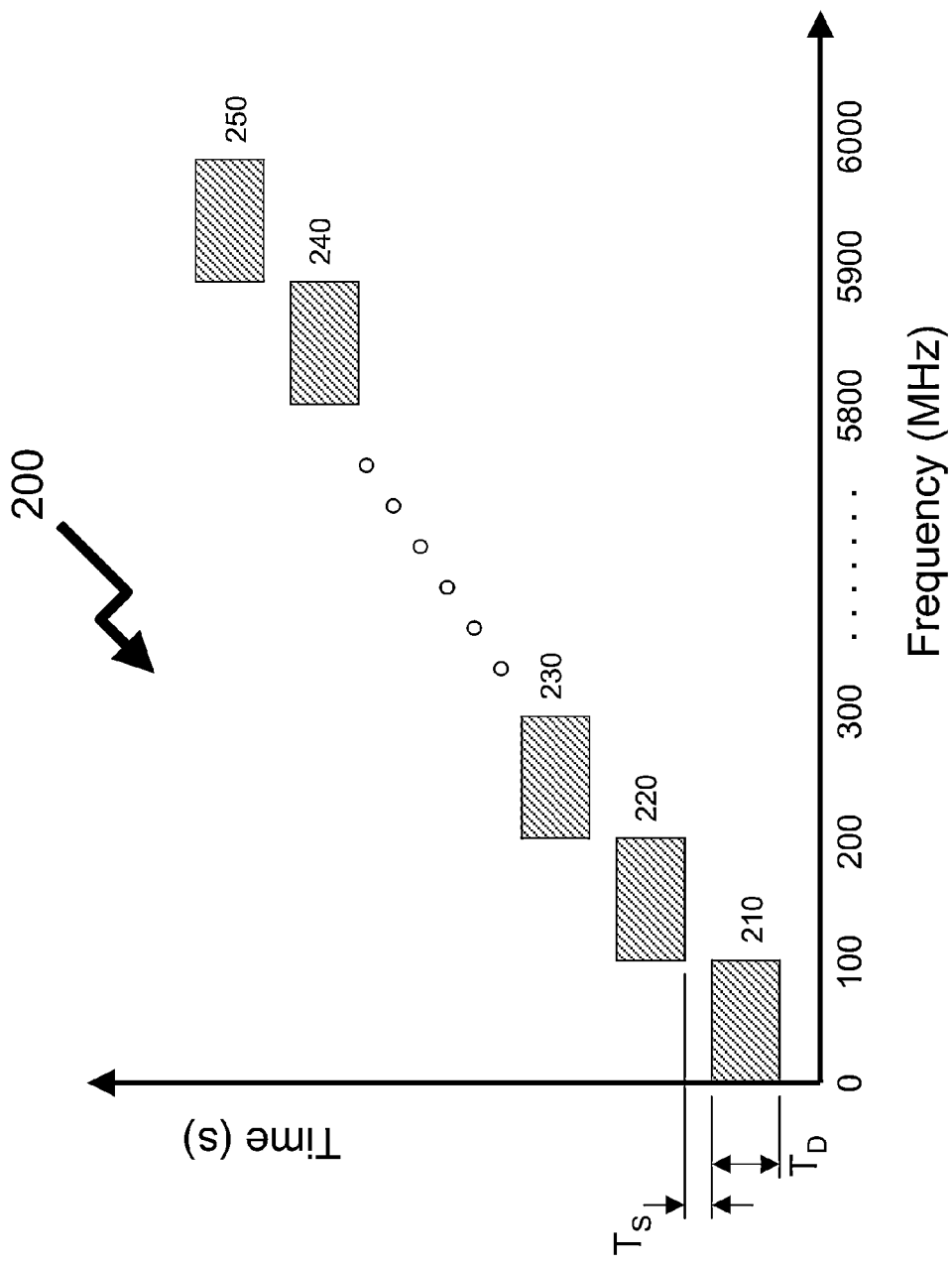
FIG. 2 depicts the sweep pattern over time of a wireless signal analyzer with a 100 MHz instantaneous bandwidth, monitoring the range of frequencies from 0 to 6 GHz.

Each WSA can be programmed to monitor a range of frequencies. The capture or instantaneous bandwidth of a WSA refers to the difference between the largest and smallest signal frequencies that it can simultaneously monitor, and is a function of the analog-to-digital converter (ADC) sampling rate within the WSA. The capture band of a WSA refers to the range of frequencies that it is monitoring simultaneously and each WSA may be established as capable of sweeping across a range of frequencies or being fixed for another range of frequencies. Referring to FIG. 2 a WSA scan 200 is depicted as being capable of sweeping across 6 GHz of bandwidth beginning at 0 Hz. If the instantaneous bandwidth of the WSA is 100 MHz, it would need to sweep across 60 capture bands, namely band 1 (0-100 MHz) 210, band 2 (100-200 MHz) 220, band 3 (200-300 MHz) 230 through to band 59 (5800-5900 MHz) 240 and band 60 (5900-6000 MHz) 250 to monitor the entire range. The amount of time a WSA spends monitoring each capture band is called the dwell time and is depicted by $T_D$ and is a user-defined quantity.

Once the WSA has completed monitoring the 60 contiguous, non-overlapping frequency bands from 0 to 6 GHz, it resumes the cycle beginning once again at 0 Hz. The default numerical value for the dwell time, $T_D$, is the amount of time required to meaningfully process a signal so as to determine if a trigger condition is met. The step interval denoted as $T_S$ is the amount of time it takes for the WSA to switch from one capture band to another. It is a finite time interval associated with analog components within the WSA, such as described below in respect of FIG. 4. It would be evident to one skilled in the art that the principle of the WSA is extendable to any feasible frequency range and number of frequency bands, rather than the 0-6 GHz used within the embodiments described herein.

Figure 3:
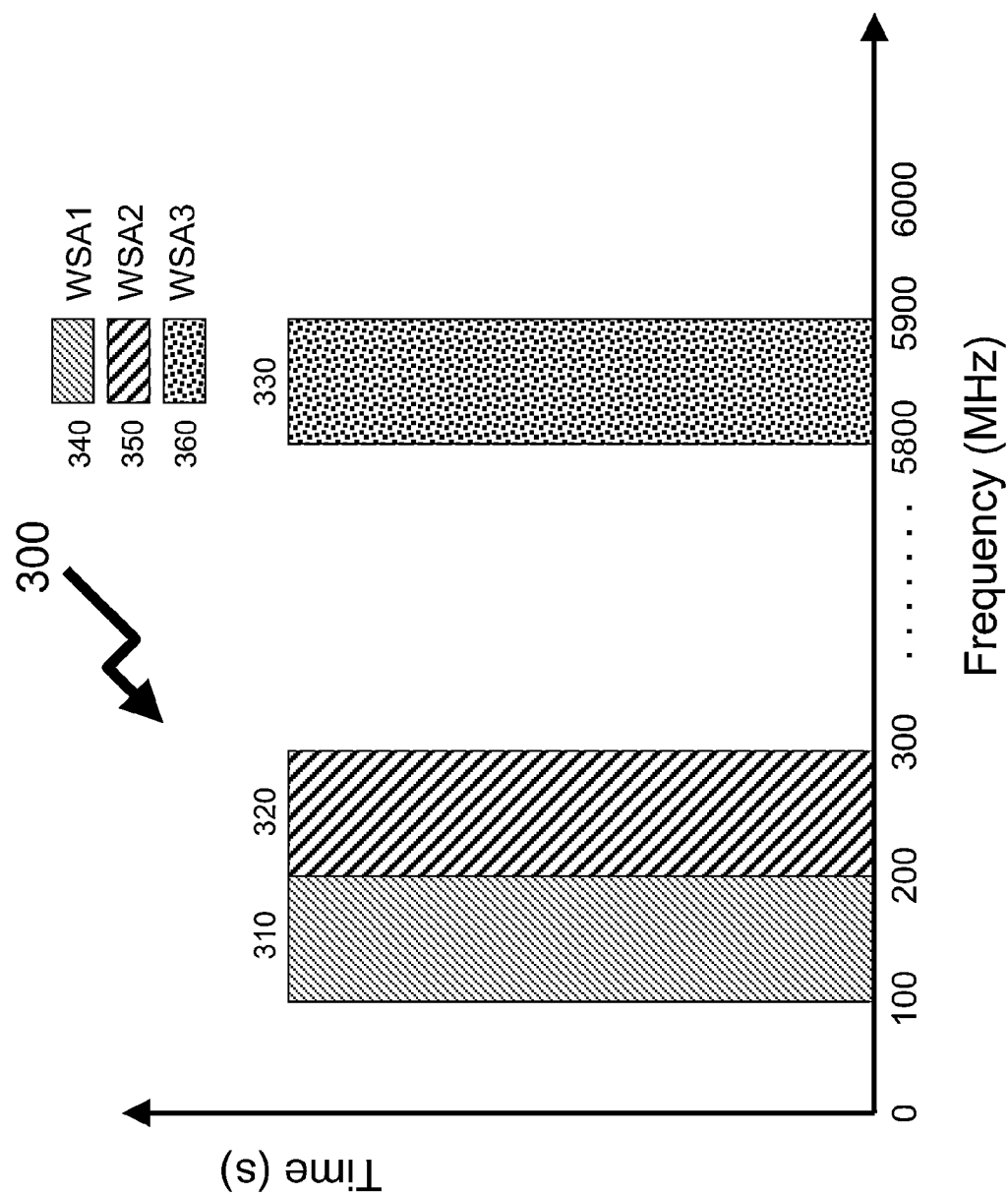
FIG. 3 depicts the capture bands of three wireless signal analyzers monitoring non-overlapping frequency bands.

Whilst the WSA steps from one capture band, i.e. band 2 (100-200 MHz) 220 in FIG. 2 to band 3 (200-300 MHz) 230, the WSA is essentially inactive for the step interval $T_S$ during which time there is a finite probability that it will not detect signals within the bands being monitored. To reduce this probability and monitor a range of frequencies greater than the instantaneous bandwidth of an individual WSA multiple WSAs can be employed according to the requirements of the network operator. Referring to FIG. 3 there is shown time-frequency plot 300 wherein the capture bands of three different WSAs, simultaneously monitoring three non-overlapping frequency bands, are shown. Frequency bands may also partially overlap to account for received signal distortion at band edges. As such these three WSAs can for instance be used to simultaneously monitor 300 MHz of frequency if the instantaneous bandwidth of each WSA is 100 MHz. As shown first WSA 340 at this instant is monitoring band 2 (100-200 MHz) 310, second WSA 350 is monitoring band 3 (200-300 MHz) 320, and third WSA 360 is monitoring band 59 (5800-5900 MHz) 330. As discussed supra once a trigger condition is satisfied, a block of data is transmitted by that particular WSA to either the first central server 130 or second central server 160 where it is stored in memory and is communicated to core server. Details of the event such as the power level, frequency or other parameters that caused the trigger and the time it occurred are recorded to a file. As determined by the priorities within the network management application the event may cause for example automatic adjustments to the network or notification to be sent by email or other similar means to the network administrator. Alternatively the received digitized signal samples are further processed digitally (decimated and down-converted) to focus in on the signal of interest. As the signal processed is of a narrower bandwidth it can be continuously streamed to the analysis server for modulation recognition and further signal analysis. It would be apparent that some trigger conditions may be established as low priority and communicated to first and second central servers 130 and 160 respectively for retaining record of the event whilst others with high priority may be communicated not only to one of the first and second central servers 130 and 160 and the core server 140.

Figure 4:
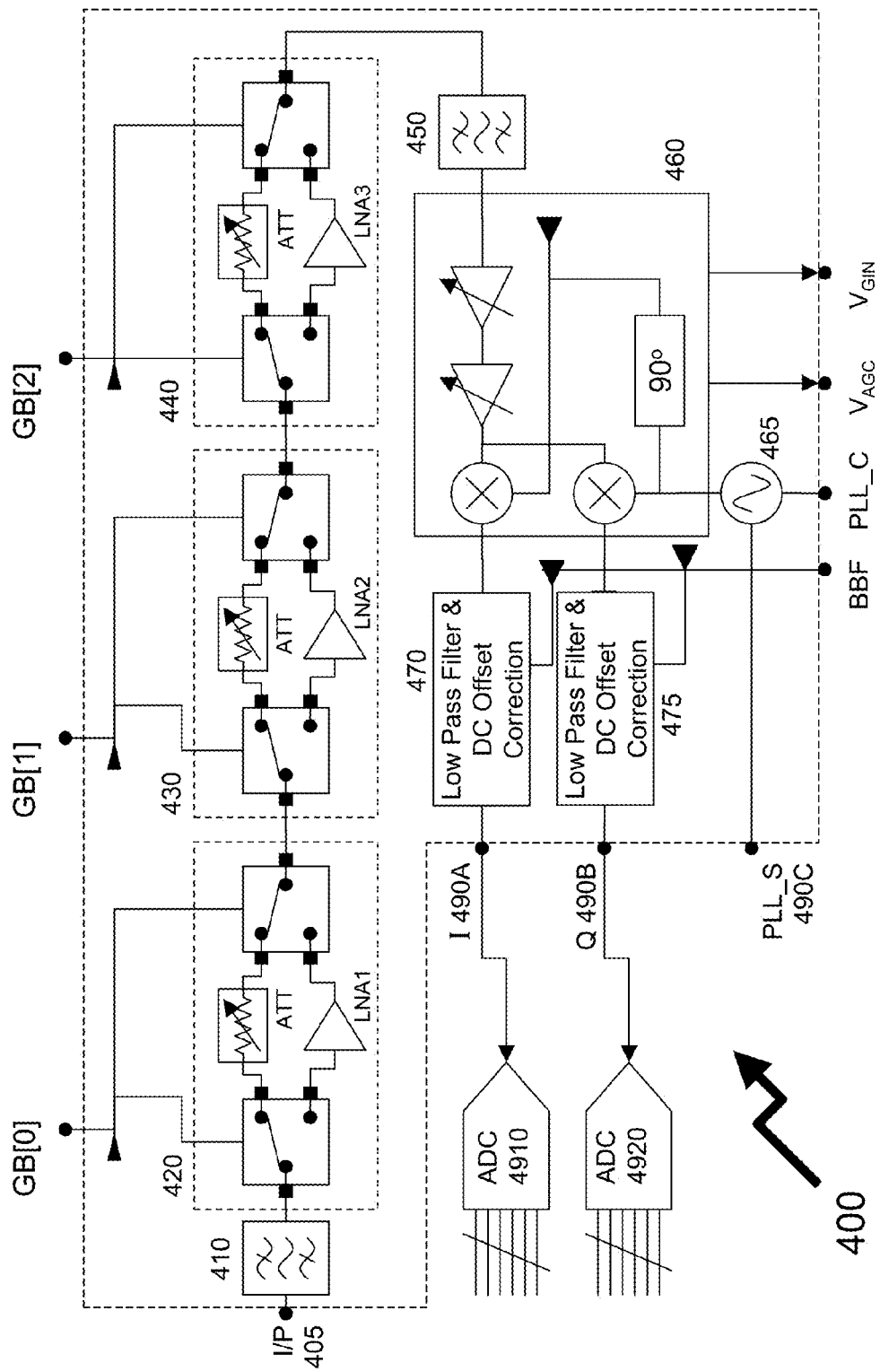
FIG. 4 depicts a direct-conversion receiver (DCR) architecture for the front-end of a wireless signal analyzer according to an embodiment of the invention.

Within each WSA is a radio receiver, as shown by receiver 400 in FIG. 4. Receiver 400 is presented as a direct-conversion receiver (DCR) but it would be apparent that other architectures, including for example low-IF or super-heterodyne, could be employed. Within the receiver 400 the receiver's local oscillator (LO) 465 is the centre frequency of the frequency band being monitored, for example 250 MHz for band 3 (200-300 MHz). Receiver 400 receives the wireless signal at the input 405 that is then passed through first passband filter 410 and through first to third gain blocks 420, 430 and 440 respectively. Each of the first to third gain blocks 420 to 440 respectively comprises a low noise amplifier (LNA) and attenuator that are switchably selected within each of the first to third gain blocks 420 to 440. The output from third gain block 440 is then coupled to second passband filter 450. The combination of first and second passband filters 410 and 450 with first to third gain blocks 420 to 440 act to adjust the levels of and limit the bandwidth of received signals entering the receiver 400 through the input port.

The output of second passband filter 450 is coupled to quadrature demodulator 460 that uses LO 465. From quadrature demodulator 460 the dual outputs, representing the in-phase and quadrature components of the down-converted signal are coupled to first and second low pass filters 470 and 475 to first and second baseband amplifiers 480 and 485, therein generating in-phase output 490A and quadrature output 490B. Output 490C provides local oscillator status information such as lock detection that can be monitored. As such the receiver 400 takes an RF input signal, demodulates into quadrature signals and converts these to their baseband equivalent. Accordingly the range of the receiver 400 in respect of frequency is determined by the frequency of the LO 465. It would be evident to one skilled in the art that the LO 465 may be implemented with different designs according to the performance and cost and may for example have a wide tuning range itself, be an oscillator with multiple harmonics that are amplified and selected by filtering and switching. Similarly the quadrature demodulator 460 may be a multi-stage design with an intermediate conversion to an IF or the RF signal after the front-end comprising first to third gain stages 420 to 440 and first and second passband filter 410 and 450 may be mixed down to an intermediate frequency prior to the quadrature demodulator 450.

It would also be apparent that other receiver architectures such as super-heterodyne or low-IF might be used to accomplish the same goal. The embodiments presented here in respect of a direct-conversion receiver have been made as this is generally a simpler design and enables wideband signal processing typically at a lower cost than the aforementioned alternative architectures thereby aiding in the widespread low cost deployment of WSAs. In the descriptions of the subsequent figures and particular embodiments of the invention the designs will be discussed within the context of a DCR front-end. It would be understood by one of skill in the art how embodiments of the invention may be adjusted to account for the use of a different receiver front-ends to the WSA. Additionally it would be evident that whilst the DC and IQ offset corrections disclosed are pertinent to direct-conversion architectures only that other corrections and correction techniques may be applicable in alternate embodiments with different receiver front-ends.

The RF filters in the receiver, for example first and second Bandpass filters 410 and 450, are typically used to reject signals in frequency bands that are either not of interest to the user or those that may cause interference with the signals under observation. A particular filter may be digitally selected from a bank of filters to pre-select a band of interest in the situation where the WSA is operable over multiple bands such as discussed supra in respect of FIG. 2. Additionally a filter's characteristics may be fixed within the DCR or under digital control. In the latter case, the filter's centre frequency, bandwidth and other characteristics can be digitally varied. The radio receiver in each WSA may be tuned to either the same centre frequency as other WSAs in the network or a unique centre frequency may be specified for a subset or for all WSAs in a network. Accordingly the network administrator can for example restrict a subset of WSAs to monitor GSM activity in an urban external portion of the network they are managing and another subset to monitor IEEE 802.11 activity within the internal building portion of their network but could dynamically adjust this according to real-world events or time of day for example. Further each WSA may be dynamically controlled to monitor a pre-defined range of frequencies with user-defined observation time intervals for each frequency band being monitored that may similarly vary based upon time of day or network loading for example. Many factors may influence the setting of each WSA and remote software control provides the network administration function with the ability to react to traffic patterns, loading, network failures, etc.

In FIGS. 1 and 2 each WSA was depicted as discrete and discussed in respect of monitoring a pre-defined range of frequencies with user-defined observation time intervals for each frequency band being monitored. It would be apparent to one skilled in the art that multiple WSAs can also be co-located, with the receiver in each WSA tuned to a different centre frequency for simultaneous monitoring of a range of non-overlapping frequency segments, such as described supra in respect of FIG. 3. It would also be apparent that the sweep patterns of multiple WSAs could also be synchronized for purposes of determining transmitter location for example. In general the network administrator, either an individual or an application in execution, can vary the WSA settings to best suit the monitoring scenario. Equally, due to their low cost and small size the network operator can also easily adjust the locations, density, and other factors relating to the WSAs to respond to factors including but not limited to changing environment, network loading, and traffic profiles.

In receiver 400 the final stage for each of the outputs from the quadrature demodulator 460 consists of an anti-aliasing low pass filter and DC offset correction circuit that can be enabled electronically. The LPF and DC correction circuit comprise the analog baseband section first analog baseband section 470 for the in-phase (I) analog signal and second analog baseband section 475 for the quadrature (Q) analog signal. It would be apparent that the characteristics of these LPFs, first and second LPFs within 470 and 475 respectively, might be fixed or dynamic and adjusted through analog or digital control signals. In the latter scenario the analog filter's bandwidth, passband, and stop band characteristics for example can be manipulated digitally. Alternatively a user can select a pair of low-pass filters from a bank of filters having different characteristics (bandwidth, group-delay, etc.). In addition, it may be beneficial or necessary to exploit a DC offset correction circuit, that if required can be enabled electronically and is discussed below.

The filtered I and Q analog baseband signals, from outputs 490A and 490B respectively are then coupled forward within the WSA wherein they are then digitized by Analog-to-Digital Converters (ADC), first and second ADCs 4910 and 4920, to generate digital I and Q data streams. The sampling rate of the ADC is typically the limiting factor in determining the maximum range of frequencies that can be monitored simultaneously or the instantaneous bandwidth. From the receiver 400 the digitized baseband I and Q signals are then coupled to a trigger analyzer sub-system. The trigger analyzer sub-system, such as time-frequency domain trigger subsystem 500 in FIG. 5 may be implemented for example as custom hardware logic within an applications specific integrated circuit (ASIC) or field-programmable gate array (FPGA) for processing. Alternatively time-frequency domain trigger subsystem 500 may be implemented within a digital signal processor (DSP) or may be partitioned and implemented within a combination of these according to the performance cost tradeoffs existing for the WSA. Accordingly different WSA implementations may exist to address different cost-performance tradeoffs. For example, a network operator such as AT&T™, Verizon™, Rogers™, Deutsche Telekom™ may wish to deploy a high density of WSAs capable of analyzing high density short range wireless signals such as Bluetooth™, IEEE 802.11 and other unlicensed bandwidth from for example 2 GHz to 3 GHz with a lower density of WSAs providing broadband spectrum analysis from 0 Hz to 6 GHz for example to capture all GSM, IEEE 802.11, IEEE 802.16 activity as well as unlicensed activity across this spectrum range. Optionally elements of the time-frequency domain trigger subsystem 500 may be omitted as evident from the description below for a trigger subsystem that performs analysis solely in the time domain or frequency domain. Time-frequency domain trigger subsystem 500 allows both trigger approaches to be employed and selected based upon control data from the network administrator.

Figure 5:
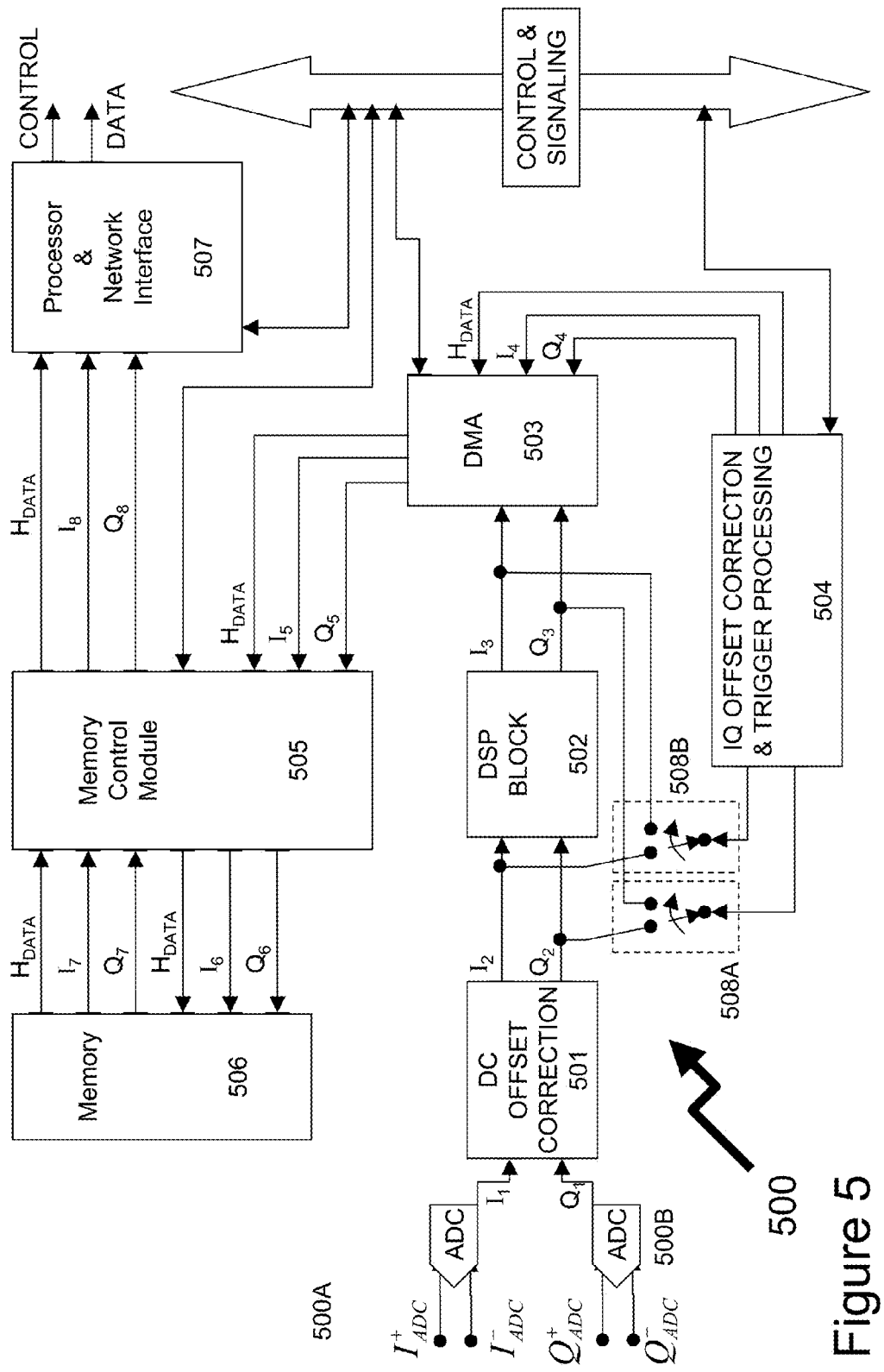
FIG. 5 depicts a trigger sub-system implementable within a field programmable gate array for the middle section of a wireless signal analyzer according to an embodiment of the invention.

Referring to FIG. 5 there is shown schematically how a signal is processed between the digitizer and the network interface, Digitized data streams I1 and Q1 from first and second ADCs 500A and 500B respectively are input to a DC Offset Correction block 501. A known issue with DCR front-end receivers is their susceptibility to both DC and IQ offsets. The signal processing must account for or eliminate these offsets as they can impact performance. Accordingly as will be explained below a user-selectable DC offset correction method may be performed on data streams I1 and Q1. DC-corrected data streams I2 and Q2 are then input to a DSP block 502 where software selectable digital down-conversion (DDC) may be performed to reduce the bandwidth of the outgoing data-stream I3 and Q3. Alternatively this stage may be bypassed. Either of the two data stream pairs (I2, Q2) or (I3, Q3) may be processed to correct IQ offsets prior to trigger processing. A variable length of continuous data samples can be processed in IQ Offset Correction and Trigger Processing block 504 to compute and correct IQ offsets prior to trigger processing.

As will be explained later trigger processing can precede IQ offset correction depending on the availability of processing resources and requirements. Alternatively IQ offset correction can be bypassed if the rate at which the correction is performed is too slow for the application. The IQ Offset Correction and Trigger Processing block 504 is used to compute an FFT on the data stream for triggering in the frequency domain. Triggering can also be performed on the time-domain samples. Results of this processing are used to send control signals to the Direct Memory Access (DMA) block 503 that is used to transfer data using the Memory Control Module (MCM) 505 to the memory block 506. The data stream pair (I5, Q5) that is transferred using DMA 503 can be either the IQ data stream pairs (I3, Q3) or (I4, Q4) in addition to data header (HDATA) information and control signaling. In this case the flow of data into the memory 506 can be controlled based on the outcome of the trigger processing.

Data stream pair (I7, Q7) from the memory 506 can be then be transferred through the MCM 505 to the Processor and Network Interface 507. Alternatively the data stream pair is further processed for information. For example only the frequency limits over which the trigger condition was breached and/or the amplitude of the recorded signal along with a time-stamp could be sent thereby further minimizing the data transferred across the network. Data from the Processor and Network Interface 507 is transmitted to a remote server, such as first central server 130 or second central server 160 in FIG. 1. As noted supra this Processor and Network Interface 507 may be wired, optical, wireless within a band covered by the WSA or wireless within a band not covered by the WSA. The destination of the triggered data out may be predetermined or dynamically determined based upon the trigger condition met. For example, a subset of trigger conditions may result in data being transmitted to a first central server 130 for determination of corrective action and another subset of trigger conditions result in the data being transmitted to second central server 160 or a core server 140.

The architecture supports the ability to store multiple triggered events that occur in quick succession and also post-trigger continuous data into memory 506 at very high rates that may not be supported over the slower network interface. For instance it might take 0.16 ms to transmit 32,000 samples over a network. If triggered events occur 0.03 ms apart, without storage into memory 506 they might be lost. Data stored in memory 506 may be transferred over the network at a slower rate for analysis.

It should be noted that the above described variations in data flow and order of trigger processing are largely determined by the signal analysis context into which the WSA is deployed. As explained earlier, the context can vary by geographic region. For instance it might be required to monitor 100 MHz of bandwidth in region 1 and only 5 MHz of bandwidth in region 2. The WSA in region 1 therefore requires trigger processing at a faster rate than the WSA in region 2. This is one example of a parameter that will determine whether the data stream pair (I2, Q2) or a digitally down-converted narrower band data stream pair (I3, Q3) should be processed for trigger events.

Table 2 below lists an exemplary time-domain trigger condition look-up table for the trigger processor 504. In this scenario a time domain sequence of samples $Signal_{SUM}=I^2+Q^2$ is computed from the I and Q data samples processed.

TABLE 2

Example of Time-Domain Trigger Settings for a WSA.

| Band index | Trigger condition | Time-domain level | Average period |
|---|---|---|---|
| 1 | Greater than | 4179 | 17 |
| 5 | Greater than | 2266 | 26 |
| ... | ... | ... | ... |
| 60 | Greater than | 1 | 0 |

The first trigger entry in Table 2 is for the capture-band indexed by the number 1 and for the trigger event to occur, the average of 17 consecutive samples should exceed the numerical value 4179. The second trigger entry is for the capture-band indexed by the number 5 and for the trigger event to occur, the average of 26 consecutive samples should exceed the numerical value 2266. The final trigger entry within Table 2 is for the capture-band indexed by the number 60 and for the trigger event to occur any sample should be non-zero.

The IQ Offset Correction and Trigger Processing block 504 also contains a frequency-domain based triggering subsystem. A Discrete Fourier Transform (DFT) is a digital implementation of a Fourier Transform, and an efficient technique of performing a DFT is called a Fast Frequency Transform (FFT) and can be used to convert digital samples from the time domain to the frequency domain. As such an FFT is computed using digitized I and Q samples within the trigger subsystem. The FFT is used to determine the spectral content of the signals being analyzed and is extensively documented in the open literature. Numerical values presented in the following descriptions are for illustrative purposes only. If the receiver 400 was implemented with first and second ADCs that sample at 100 MS/s then it is capable of analyzing close to 100 MHz wide range of frequencies simultaneously and this is the instantaneous bandwidth of the WSA. In actual practice the usable instantaneous bandwidth for this sampling rate is about 80 MHz due to the roll-off of the necessary anti-aliasing filters. It would be apparent to one skilled in the art that the ADC specified is a cost-accuracy-speed tradeoff wherein for example suppliers such as National Semiconductor ADCs operating at 100 MS/s with 16-bit accuracy up to 3000 MS/s with 8-bit accuracy.

Figure 6:
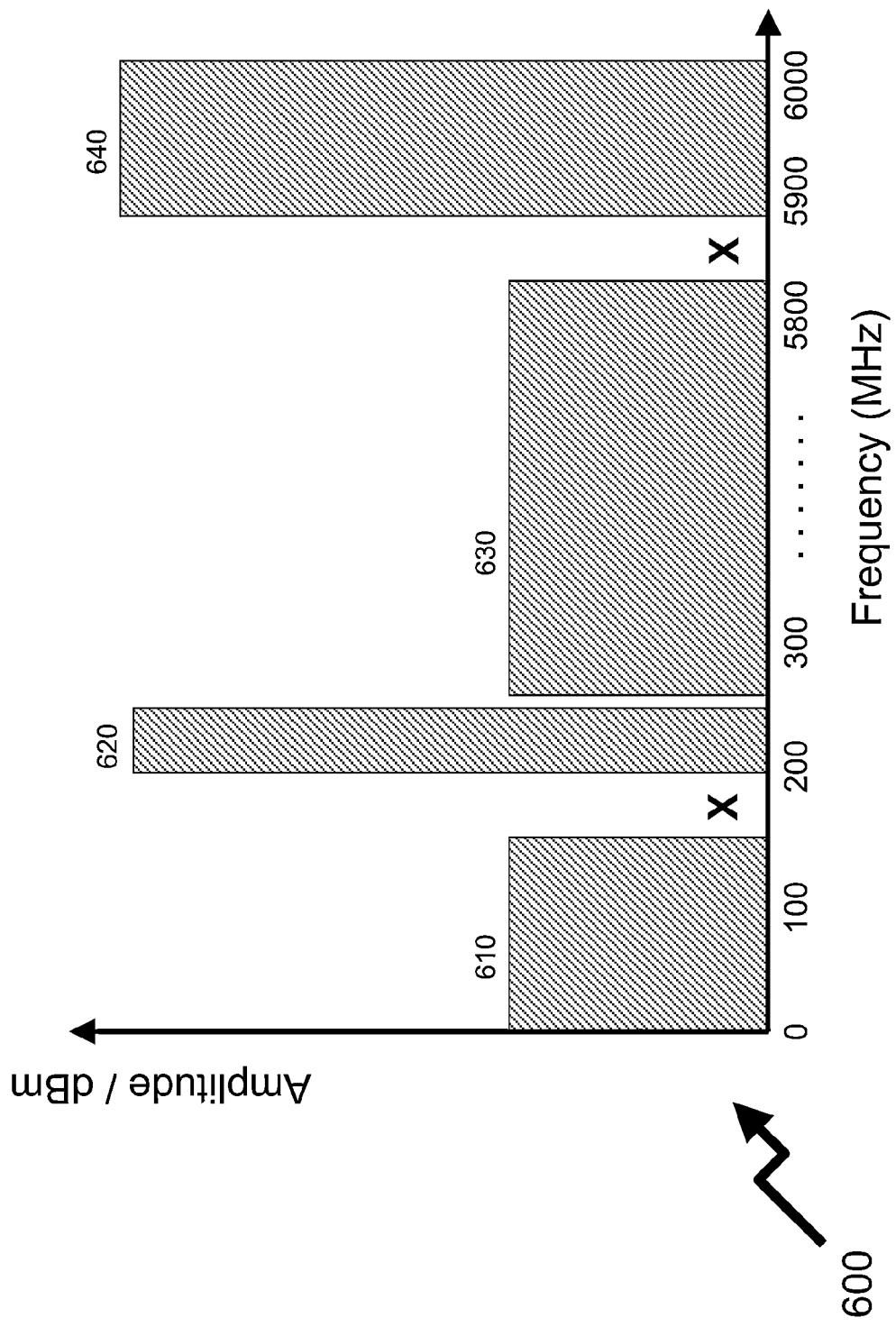
FIG. 6 depicts an example of a user-defined trigger template for use with a trigger sub-system such as shown in FIG. 5.

Thereby the output of FFT processing for a FFT performed on a series of 1024 complex samples is a set of complex data of the same length. Each output sample represents the complex amplitude of a spectral line within the range of frequencies being analyzed. For 100 MS/s sampling rate and 1024 samples therefore the indices within the data record represent spectral lines separated by 100 MHz/1024=97.66 kHz and this is the spectral resolution of the FFT process. A longer length of samples would have to be processed for increased spectral resolution and as discussed elsewhere the implementation of the circuitry may be fixed for all WSAs or varied according to the cost-performance-deployment scenario. As such an FPGA implementation of the circuitry may be generalized to support different sizes of FFT and different sample rates with relative ease. Accordingly FFT processing generates output data I–$FFT_{OUT}$ and Q–$FFT_{OUT}$ and within the IQ Offset Correction and Trigger Processing block 504 wherein the square of the absolute value of the FFT output, $FFT_{OP}$=I–$FFT_{OUT}^2$+Q–$FFT_{OUT}^2$ is compared with a predetermined frequency trigger template, such as shown in FIG. 6 for example. As with the time-domain trigger a trigger event determined by trigger processor 504 results in I and Q data streams of a predetermined length being sent from the memory block 506 to the network interface 507 and being transmitted to a remote server. For synchronization purposes a number of clock signals are shared across the IQ Offset Correction and Trigger Processing block 504 and other blocks including DMA 503, MCM 505 and Processor and Network Interface 507. These are not explicitly shown for clarity as well as other implementation details that would be evident to one skilled in the art.

Referring to FIG. 6 an example of a network-administrator determined frequency trigger template is shown by template 600. Template 600 spans the range of frequencies being analyzed and has the same frequency resolution as the FFT. As such for the time-frequency domain trigger sub-system 500 considered above with 100 MHz bands and 1024 samples the user mask is specified at spectral lines separated by 97.66 kHz, i.e. at close to 62,000 points for a full 6 GHz range. Alternate templates may be employed for example specifying only the frequencies that the WSA scans, i.e. if only 2 bands are scanned fully only 2048 points need defining to reduce network usage when configuring or reconfiguring each WSA from the network administrator. The template 600 specifies a trigger condition for each spectral line within the frequency range being analyzed in terms of an amplitude, for example in dBm. Once a template 600 and corresponding trigger condition has been specified by the network administrator the WSA allocates centre frequencies to monitor the bands that include the user-defined spectral lines. In the reduced data format the template 600 also therefore provides the WSA with the number of capture-bands or portions of the capture-bands.

As shown for template 600 the trigger has been set for a first frequency band 610 of 0-150 MHz, a second frequency band 620 of 200 MHz to just below 250 MHz, a third frequency band 630 from just above 250 MHz to 5825 MHz, and a fourth frequency band 640 from 5875 MHz to 6000 MHz. According to the template 600 each trigger condition consists of an operator and a numerical value, such as shown for example in Table 3 below. Table 3 lists example trigger conditions and represents a partial list of trigger settings for the entire set of spectral lines within the capture band under observation labeled as "Band Index 1" in the first column of Table 3 as they can be monitored simultaneously.

TABLE 3

Frequency Domain Trigger Settings for a WSA.

| Band Index | Spectral Line | C1 | Value1 | Op | C2 | Value 2 | Persistence interval |
|---|---|---|---|---|---|---|---|
| 1 | 20 | > | 1575 | — | — | 3 |
|   | 21 | x | — | — | — | — |
|   | 22 | > | 1424 | OR | < | 1007 | — |
|   | 23 | < | 700 | — | — | — |

Within Table 3 numerical values may be real numbers representing expected signal amplitudes. A do-not-care (x) operator associated with a spectral line implies that signal levels at that spectral line are to be disregarded. In other words they do not result in any triggers under any circumstances. The first entry for example stipulates that the $20^{th}$ spectral line should have a level that exceeds the numerical value of 1575 for 3 consecutive FFT intervals for a trigger to occur. Alternatively an average numerical value for a number of FFT intervals can be specified as a trigger condition. The second trigger entry stipulates that the $21^{st}$ spectral line is a do-not-care, The third trigger entry stipulates that if the level of the $22^{nd}$ spectral line exceeds 1424 or drops below 1007 for 3 consecutive FFT intervals then the trigger should occur whilst the fourth trigger stipulates that if the level of the $23^{rd}$ spectral line is lower than 700 for 3 consecutive FFT intervals then the trigger should occur. In this scenario a trigger has been defined to occur if any of the defined criteria is valid. Another trigger definition might require that all of the above conditions be satisfied for a trigger to occur. It would be apparent that the number of consecutive FFT intervals set by the persistence interval might also be varied for each trigger entry. Alternative data formats and reductions thereof will be evident to one skilled in the art to provide the same functionality to the time-frequency domain trigger subsystem with reduced data content to be transmitted. As well it would be apparent that the user might define more complex criteria to trigger on, tag and prioritize. For example a user might want to trigger on both a narrowband signal and a wideband signal that overlap in their frequency limits within the same capture band and tag them appropriately if they exceed user-specified masks.

In the IQ Offset Correction and Trigger Processing block 504 in the case of a spectral trigger mask definition, as the data exits the FFT processing subsystem in a pipelined fashion each value is compared with the user mask in IQ Offset Correction and Trigger Processing block 504. If the trigger condition is satisfied for the time duration represented by the persistence factor, then data is transmitted from the Processor and Network Interface 507. This data may be for example the FFT record, the digitized data from the IQ memory 506, processed IQ data stored in memory 506, or a combination of these together with other data as specified by the network administrator.

Figure 7:
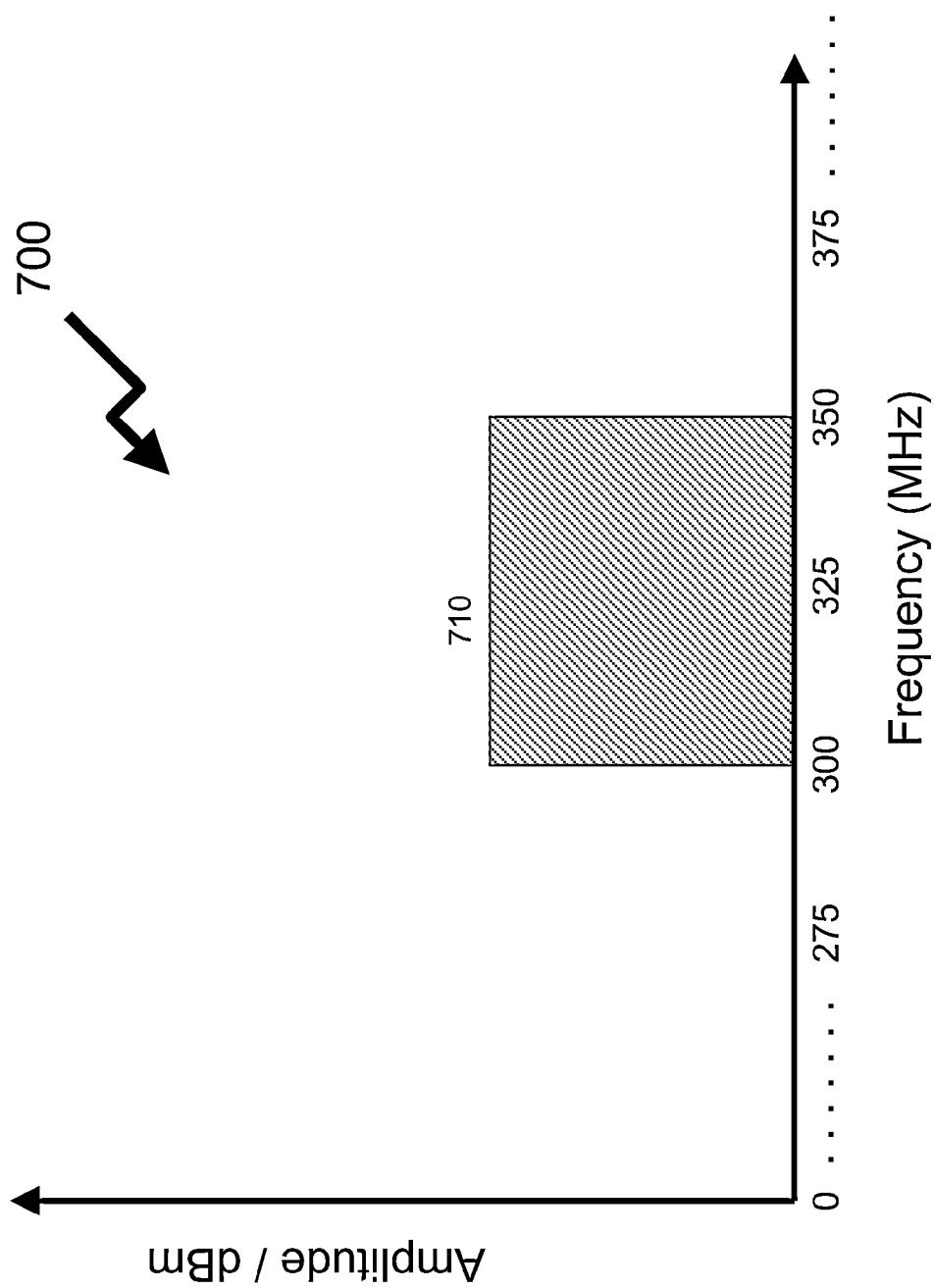
FIG. 7 depicts an example of an integrated power mask trigger template for use with a trigger sub-system such as shown in FIG. 5.

In addition to the time domain and frequency domain triggering presented supra in respect of FIGS. 5 and 6 the triggering may be based upon other specified conditions or a combination of conditions. One example of alternate conditions is frequency-domain integrated power triggering wherein an integrated power mask trigger specifies a total power threshold over a range of frequencies. A trigger condition is specified to be satisfied when the detected power exceeds or falls below this threshold. Referring to FIG. 7 there is shown an example of an integrated power mask wherein first power mask 710 establishes the threshold for the frequency band 300-350 MHz. The integrated power over the range of frequencies is computed by calculating $Signal_{SUM}=I^2+Q^2$ at each spectral line and taking the cumulative sum, $$\sum_{f1}^{f2} Signal_{SUM},$$

wherein f1 and f2 represent the lower and upper frequencies respectively, i.e. over the frequency range defined by the mask. If $$\sum_{f1}^{f2} Signal_{SUM}$$

exceeds the level defined by the mask, then the trigger condition is satisfied and as with the frequency-domain trigger presented supra, either the FFT record, the digitized data from the IQ memory block 506, processed IQ data, or a combination of these together with other data as specified by the network administrator, are transmitted by the Processor and Network Interface 507.

Figure 8:
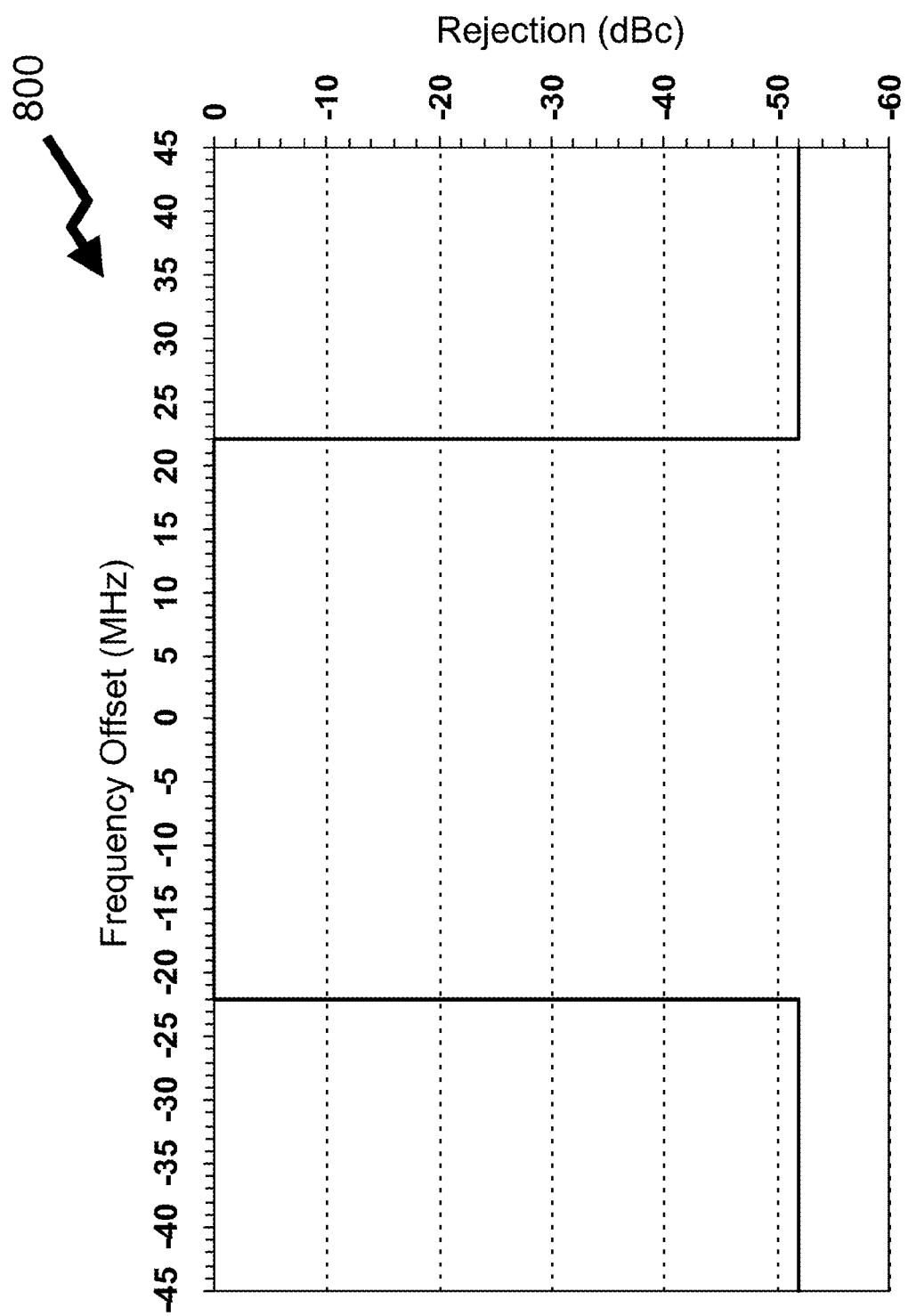
FIG. 8 depicts an Out-of-Bounds Emissions Mask according to IEEE 802.11g.
Figure 9:
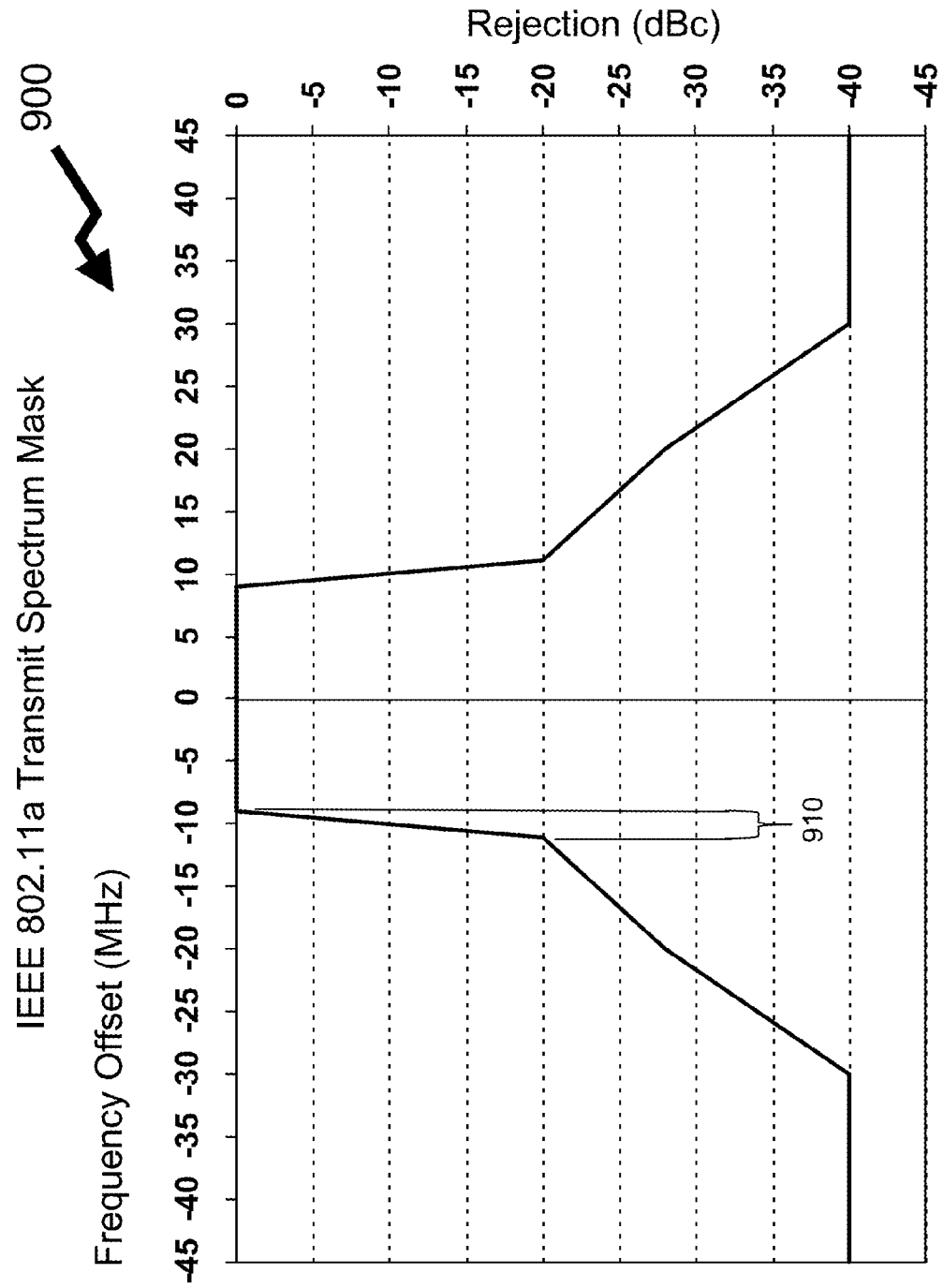

In the previous discussions in respect of FIGS. 5, 6 and 7 the WSA was considered in respect of time domain, frequency domain and integrated power mask triggers respectively. However, a policy may be applied for other aspects of wireless communications such as verifying compliance of a transmitter to an international standard. For example, referring to FIG. 8 there is shown the out-of-band (OOB) emissions mask for transmitters operating according to the IEEE 802.11g standard. As shown by template 800 OOB emissions are specified as a minimum of 52 dBc relative to the emission within the allowed transmission window of ±22 MHz. As noted supra in respect of FIG. 5 with frequency-domain triggering the frequency steps were ~100 kHz (~0.1 MHz) thereby allowing such a verification to be achieved for transmitters within the range of a WSA. Similarly referring to FIG. 9 a slightly more complex compliance is depicted by template 900, which shows the transmission mask for an IEEE 802.11a compliant transmitter. As can be seen in template 900 the allowed spectrum drops from ±9 MHz from centre frequency to 20 dB rejection at ±11 MHz, and then slopes to −40 dB at ±30 MHz offset. Hence, each side-slope 910 corresponds to 2 dB/0.1 MHz such that the resolution of a WSA such as described supra providing 100 MHz bandwidth with ~0.1 MHz resolution is suitable to compliance verification of such transmitters.

It would be apparent to one skilled in the art that the policies outlined above are exemplary in nature and that many other policies may be established which may or may not relate to those set by authorities including but not limited to International standards, national standards, provincial/state standards, city standards, etc. or policies established by enterprises including but not limited to hospital, malls, commercial centres, etc.

As discussed supra with DCR front-end receivers it may be necessary to implement DC-offset cancellation and false trigger avoidance techniques within the WSA. In the following sections there follows explanations of frequency triggers with reference to understanding of the frequency mask. Within the prior art, see for example B. Razavi in "RF Microelectronics" (Prentice Hall Communications Engineering and Emerging Technology Series), it is taught that DC offsets in direct-conversion receivers (DCR) are the result of self-mixing of the local oscillator (LO) signal or strong interfering signals at the input of the receiver. A standard technique to eliminate DC offset is to down-convert the signal to a non-zero intermediate frequency and process it. In this case, however, the resultant instantaneous bandwidth is at most half of what it would be if the signal were down-converted to an IF of zero.

In general the magnitude of the DC offset is not fixed and varies across the frequency band. Accordingly, DC offsets can:

(1) mask the presence of an input signal at the same frequency as the LO;
(2) result in false triggering if the capture band includes the frequency to which the LO is tuned as shown by the first schematic 1000 in FIG. 10, thereby alerting the user to the presence of a signal when in fact there is none; and
(3) degrade receiver dynamic range.

Figure 10:
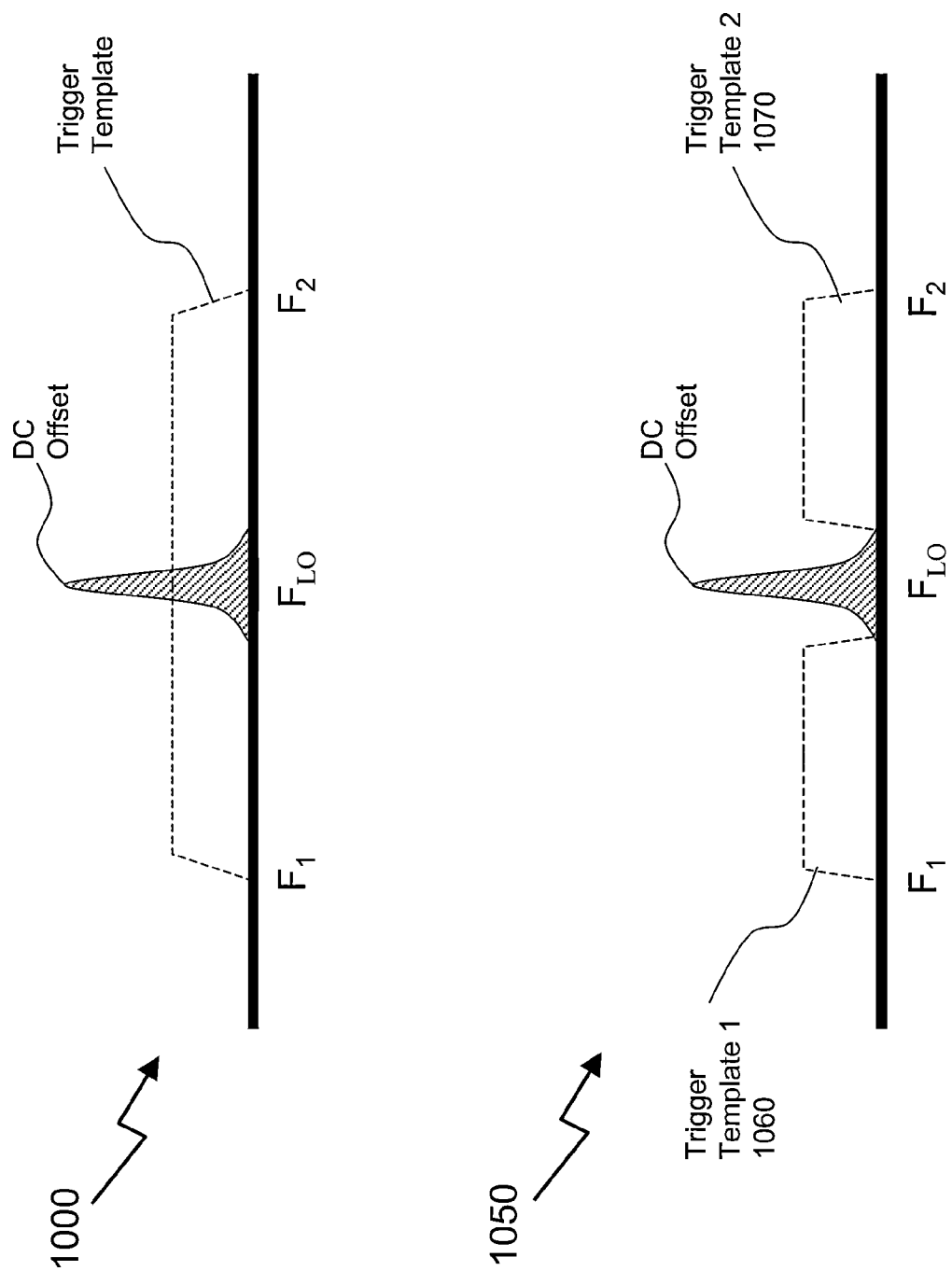
FIG. 10 depicts solutions to mitigating DC offset according to an embodiment of the invention.

According to embodiments of the invention there is taught a user-selectable setting approach to mitigate the impact of DC offsets on performance. In the event that the user only wants to eliminate the impact of false triggering (2) then a software option can be selected to enable a split in the trigger template to be applied, as shown in FIG. 10, wherein lower and upper trigger templates 1060 and 1070 are applied around the signal.

In the event that the user wants to eliminate both the impact of both masking (1) and false triggering (2) as outlined above, then the user can select either one or a combination of the following two exemplary techniques:

(a) DC Offset Correction Loop: A relatively simple and straightforward technique is for the WSA to employ the DC offset correction loop enabled by the ADC. Post-digitization ADCs, such as the AD9640 for example from Analog Devices Inc., implement a digital high pass filter with a user-selectable bandwidth to a maximum of about 1 kHz. This high pass filter can be used to mitigate DC offset. However, in practice residual DC offsets, as high as 10 dB above the noise floor of the receiver, have been observed. The residual offset can then present a problem if the amplitude threshold of the trigger is less than 10 dB above the noise level.

(b) Software Loop A little more complicated this technique employed by the WSA further reduces the DC offset by using a software loop on startup, which may for example be part of an embedded processor in an FPGA or in digital logic, within the WSA. Using this software loop the mean of the signal is computed by averaging over the length of the sample sequence. Use of software offers the flexibility to average over arbitrarily long time intervals should this be necessary. The magnitude of the DC offset corresponding to a frequency band can be calculated continuously or only on startup during a calibration phase with the value frozen thereafter and applied as a correction at run-time.

Figure 11:
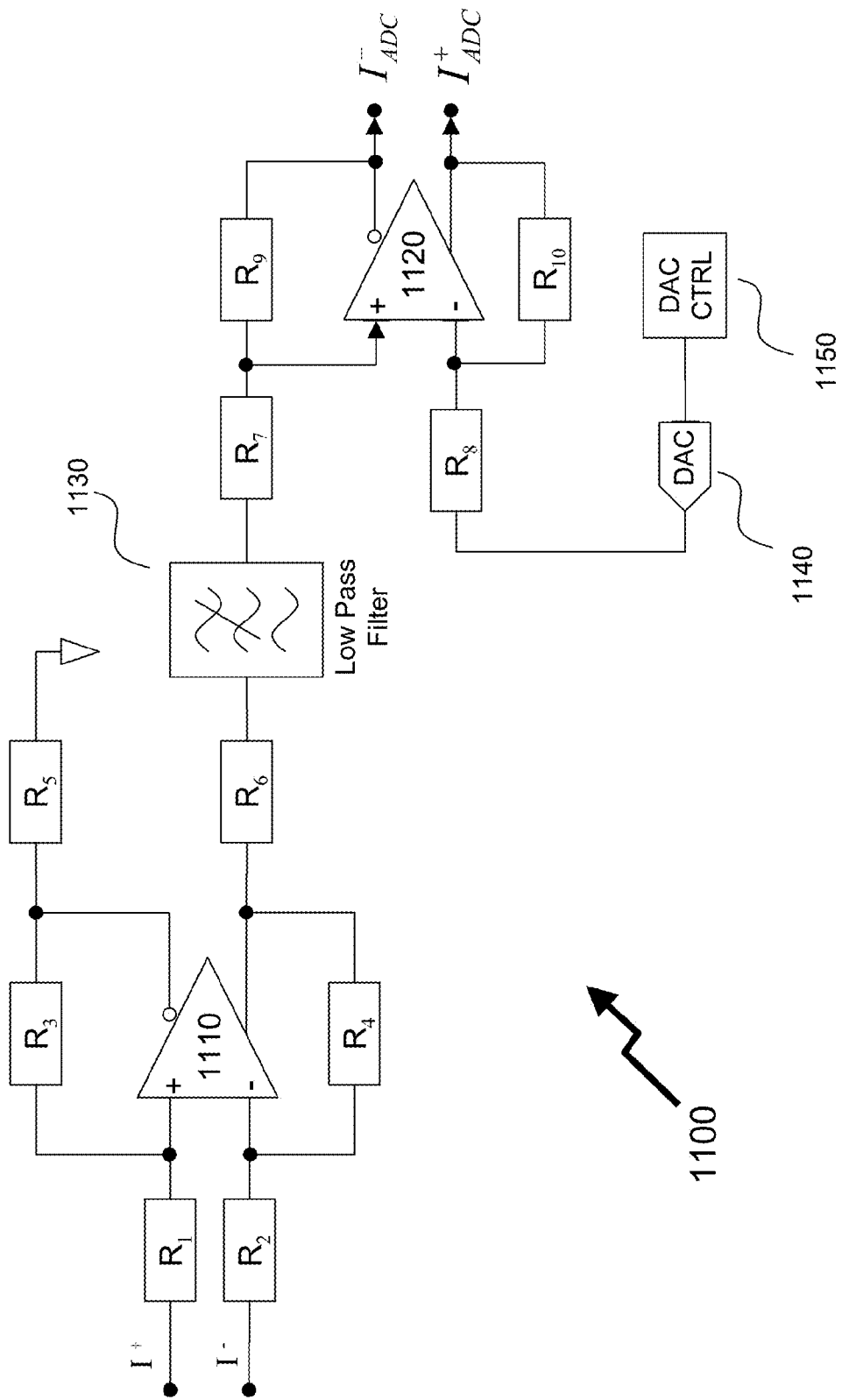
FIG. 11 depicts an analog technique for correcting DC offset within a DCR front-end of a wireless signal analyzer.

In the event that the user wants to eliminate the impact of all three DC offset related impairments explained above then amongst the solutions is the following analog technique which can be used either by itself or in conjunction with either of the two post-digitization DC offset removal techniques above, namely the DC Offset Correction Loop or Software Loop. Referring to FIG. 11 there is shown an analog DC offset removal circuit 1100. In FIG. 11 an analog DC offset removal circuit 1100 is shown only for the I channel. It would be apparent to one of skill in the art that the circuit is essentially replicated for the Q channel. A differential pair of analog baseband signals I+ and I− are input to the first operational amplifier 1110 that converts the differential signals to a single-ended output that is input to a low-pass anti-aliasing filter 1130. The filtered output is fed forward to the second operational amplifier 1120.

A DC voltage output from a digital-to-analog converter (DAC) 1140 controlled by a DAC Control 1150, perhaps implemented as part of a FPGA, is applied to the other terminal of this second operational amplifier 1120. This DC voltage level is determined from the DC offset measured using the output of the ADC, in separate reference block which is not shown for clarity, either after computing a mean of a sequence of samples, from the FFT output of the trigger processing block, for example IQ Offset Correction and Trigger Processing block 504, or from an FFT calculation performed at the remote server. The DAC 1140 output is adjusted until the DC level is reduced to an acceptable quantity. This level is usually at or very close to the noise level measured in the FFT.

The second operational amplifier 1120 converts the single-ended input to a differential signal outputs $I_{ADC}^+$ and $I_{ADC}^-$ that are input to the first ADC 500A of FIG. 5. It should be noted that this circuit has been designed with the requirement that it can draw from commercially available libraries of footprint compatible anti-aliasing low pass filters that are intended for single-ended operation in its implementation. It would be apparent to one skilled in the art that a number of variants to the above circuit can be designed around the same concept with or without the requirement of exploiting such commercial libraries.

Each of the above techniques individually or in combination can be used via software-selectable options to mitigate DC offset depending on the operating scenario and the desired accuracy or minimum trigger threshold. It would also be apparent that a change in operating environment can also lead to the appearance of a dynamic DC offset that can result in a false trigger conditions or mask the presence of actual signals at the centre of the capture band or the frequency to which the RF LO is tuned.

In order to deal with dynamic DC offsets, the WSA may store in its memory a list of expected DC offsets at meaningful frequency intervals across its operating range, e.g. temperature. The applied DC offset may be computed for each data-packet. When a DC offset that exceeds this expected value by an unacceptable margin is observed, then the WSA can be automated to zoom into the signal of interest by offsetting it or shifting the LO frequency for example. Once this is done, it can be determined if the signal was the result of, for example, LO self-mixing in combination with a change in the propagation environment or an actual input signal at the centre of the band under observation.

Within the prior art various solutions to the above issue of DC offset have been reported, including U.S. Pat. No. 6,862, 439 entitled "Offset Compensation in a Direct-Conversion Receiver" by S. Feng. Feng teaches to an offset cancellation technique that utilizes dynamic offset compensation elements in conjunction with variable gain amplifiers and a static compensation element. The static compensation element utilizes an ADC and a DAC to provide offset compensation. Accordingly it would be apparent to one skilled in the art that the approach of Feng and that taught supra in respect of FIG. 11 are different even though they might achieve similar overall offset cancellation. Referring to FIG. 11 the inventors teach to a chain comprising differential amplifier, low pass filter, differential amplifier and then a static offset compensation block, wherein the filter is selected from widely available commercial low pass filters that operate on single-ended inputs. In contrast Feng teaches to a chain comprising differential variable gain amplifier (VGA), differential low pass filter, and differential VGA wherein each differential VGA employs a dynamic offset compensation technique.

Figure 12A:
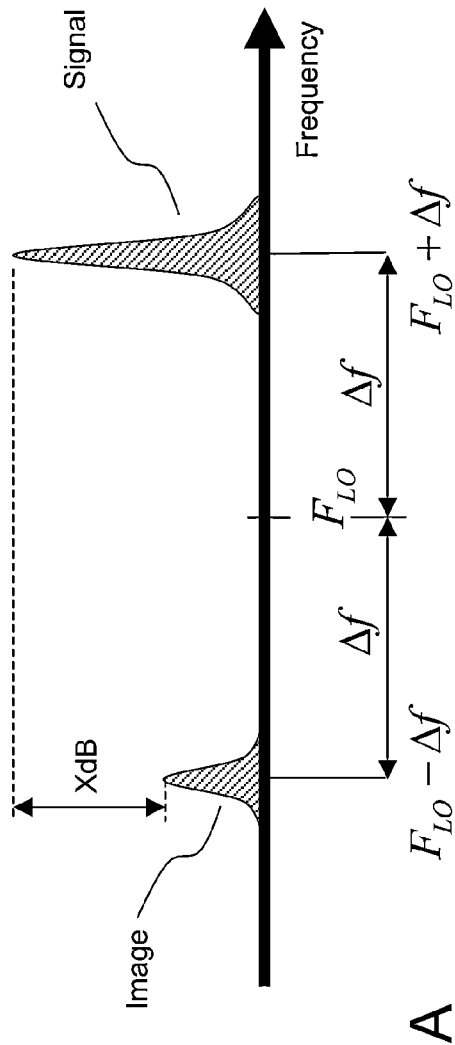
FIG. 12A depicts the effect of mismatches between the in-phase and quadrature components of the baseband signal resulting in an image of the signal being generated in the FFT output.

IQ Offset Correction and False Trigger Avoidance:

Direct-conversion receivers (DCR) suffer mismatches between the in-phase and quadrature components of the baseband signal wherein phase and amplitude imbalances between these components result in an image frequency in the FFT output as shown in FIG. 12A. The separation of the signal from the centre frequency is the same as that of the image from the center frequency. J. Tsui in "Digital Techniques for Wideband Receivers" (Artech House, 1995) has presented an analytical calculation of the amplitude difference between the received signal and the image for different values of phase and amplitude mismatch. Ideally the image should fall below the noise floor of the receiver to prevent any false triggering. Additionally in applications that require demodulation of the received signal, such imbalances distort the down-converted signal constellation thereby degrading the bit error rate performance of the receiver.

The IQ offsets depend on many factors, including but not limited to device characteristics, frequency of operation and temperature. Many solutions to the problem of IQ offset correction have been proposed in the prior art. In U.S. Pat. No. 7,167,513 entitled "IQ Imbalance Correction" by E. T. Tsui et al there is taught a method for IQ offset correction based upon estimating the offset on the basis of a constellation error in a received OFDM signal and then correcting it using a transformation that includes an adaptive filter. However, such techniques are not feasible in a generalized signal detection application like the one under consideration for a WSA.

More recently O. Myllari et al. in "Digital Transmitter I/Q Imbalance Calibration: Real-time Prototype Implementation and Performance Measurement" (18th Eur. Sig, Processing Conf., August 2010, pp. 537-541) presented a transmitter pre-distortion technique to correct for IQ offset errors, and off-line calibration techniques have been presented by G. Fettweis et al. in "Dirty RF: A New Paradigm" (International Journal of Wireless Information Networks, Vol. 14, No. 2, June 2007, pp 133-148) using analog test signals have also been investigated as a potential solution.

However, in the scenario of a WSA where signal analysis is performed with no control or knowledge of transmit parameters, pre-distortion techniques cannot be applied. Furthermore off-line calibration techniques are difficult to implement in a real-time, always on monitoring environment as well due to the complexity of variations in offsets with effects such as device performance variations, temperature, and frequency. Even small perturbations from the correct values can cause large differences leading to undesirable image signal levels.

Accordingly trigger processing and IQ offset computations are performed in a block, such as IQ Offset and Trigger Processing 504 in FIG. 5 supra. Depending on the instantaneous bandwidth and speed at which the processor in the WSA operates different methods can be employed. Two exemplary methods are:

Method 1: IQ Offsets are Calculated Prior to Trigger Processing.

In situations where the speed at which offset correction processing can be performed is fast enough for the instantaneous bandwidth, then calculating IQ offsets using algorithms such as that implemented by J. Tsui in "Digital Techniques for Wideband Receivers" are relatively straightforward to implement on the received data stream in the WSA. Once the offsets have been calculated they can be corrected and the balance restored.

Figure 12B:
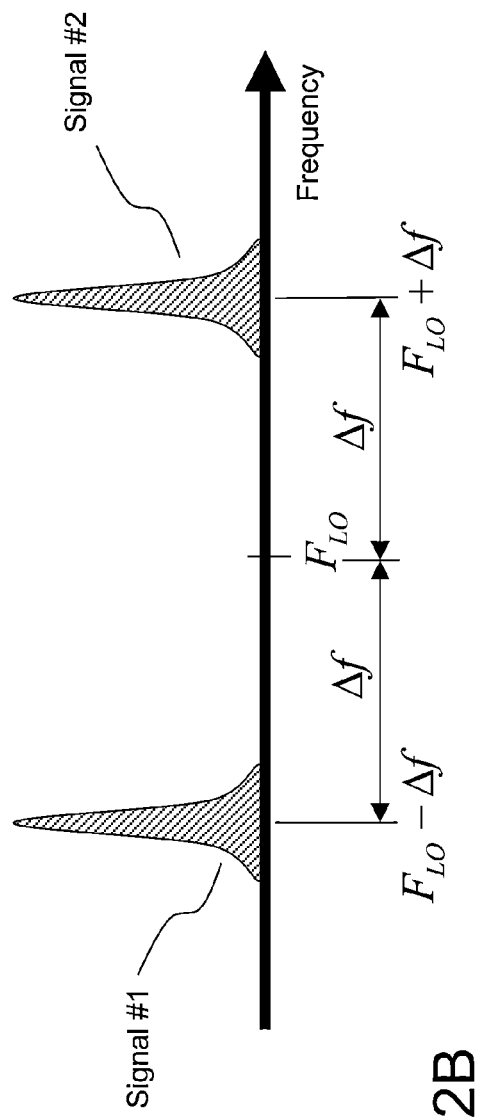
FIG. 12B depicts the scenario wherein two tones with equal frequency separation from the local oscillator are present.

It is however possible in some real-world situations for two tones with equal frequency separation from the LO to exist as shown in FIG. 12B. In this scenario, the phase and amplitude offset estimate calculation would result in quantities that exceed or deviate from the bounds that would normally be expected from a characterization of the IQ offsets in a factory environment. Hence an essential step in correcting IQ offsets is first determining whether the offset lies within acceptable bounds using the following process:

Check if the computed phase and amplitude IQ offsets lie within expected minimum and maximum values determined using a pre-deployment verification process. It would understood by one skilled in the art that this value depends on, amongst other factors, the frequency of operation and accordingly may be loaded into the WSA's non-volatile memory during factory verification and validation testing.

(1) If the offsets lie within the predetermined limits, correct the offset.
(2) If the offset does not lie within the predetermined limits, offset the centre frequency to a new centre frequency to determine if there are two signals present within the spectrum separated by where was the separation between either of the tones and the initial LO frequency.
(3) If two signals are not present, raise and log a warning condition with the appropriate message notifying the system administrator of the event.

It may not be necessary, or possible, to perform steps 2 and 3 above depending on the computational requirements and the latencies that these actions might cause with the WSA. If the offsets do not lie within the limits then it can be deduced with a high probability that there are two signals present as shown in FIG. 12B and no correction should be performed.

Method 2: Trigger Processing Performed Prior to IQ Offset Calculation.

The preceding method describes IQ offset correction prior to performing the trigger calculation. In a scenario where the time required to implement either of these computational techniques is large and results in an interruption to the rate at which the ADC operates (consistent with a large instantaneous bandwidths), one of two low complexity techniques can be implemented as described below:

1) The range of IQ phase and amplitude offsets as observed in the factory can be used to determine an expected difference in power between the signal and its image. If, in the triggered data a mirrored version of the signal that triggered the event is observed at the approximately the expected power difference, X dB, as shown in FIG. 12A, then it is likely to be a false trigger and should be disregarded. In all other cases the data is valid.
2) No IQ offset correction is performed and the data is treated as valid.

In both of the above situations, the IQ offset calculation can be performed at the server 130 and re-checked for validity using expected values prior to correction. It is recognized that in this scenario there is a finite overhead associated with transmitting data associated with false triggers. However as the likelihood of the scenario shown in FIG. 12A is often small, the associated overhead can be deemed negligible and acceptable. Finally it is important that IQ offset correction be made at the server prior to notifying the administrator or taking any further action.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A network comprising:
   at least one signal analyzer of a plurality of signal analyzers comprising a wideband receiver characterised by an operating bandwidth, each signal analyzer associated with a predetermined location and providing signal analysis of at least one user-specified frequency band of a plurality of user-specified frequency bands to determine whether signals detected by the at least one signal analyzer within the at least one user-specified frequency band comply with at least a user-defined policy of a plurality of user-defined policies stored within a memory of the at least one signal analyzer of the plurality of signal analyzers; wherein,
      each user-defined policy relates to a power, frequency, and time mask for the at least one user-specified frequency band and comprises a series of settings, each setting comprising:
         a band index relating to a frequency capture band within the at least one user-specified frequency band, a trigger type for the band index, a time domain level for the band index, and an averaging period for the setting defined by a number of consecutive signal samples; and
         a spectral line defined by a sample within output samples of a Fourier Transform applied to the signals received within the at least one user-specified frequency band, a trigger type for the spectral line, a value for the spectral line, and a persistence interval defined by a number of consecutive signal samples;
      the plurality of user-specified frequency bands having a fixed bandwidth significantly smaller than the operating bandwidth; and
   at least one server of a plurality of servers, each server only receiving a trigger signal from a signal analyzer within a predetermined subset of the plurality of signal analyzers when signal analysis denotes a predetermined condition with respect to compliance to the at least one user-defined policy.

2. A network according to claim 1 wherein; when multiple signal analyzers are associated with the same predetermined location they are operated so that each signal analyzer provides spectral analysis of different user-specified frequency bands of the plurality of user-specified frequency bands.

3. A network according to claim 1 wherein; a predetermined portion of the plurality of signal analyzers are synchronized in respect of their sampling clock, the sampling clock being employed within a predetermined portion of the spectral analysis portion of a signal analyzer and generated by a predetermined signal analyzer of the predetermined portion of the plurality of signal analyzers and independent of signals being analysed.

4. A network according to claim 1 wherein, at least one of data relating to the at least one user-specified frequency band and at least one user-defined policy are communicated to the at least one signal analyzer from at least one of the at least one server and a network administration application, the network administration application in communication with at least one of the at least one server and the at least one signal analyzer.

5. A network according to claim 4 wherein, the data comprises information relating to at least an aspect of the signal analysis, the aspect selected from the group comprising a time interval to monitor the at least one user-specified frequency band, a lower frequency for the at least one user-specified frequency band, an upper frequency for the at least one user-specified frequency band, a gain to be applied to received signals for analysis, a length of a Fast-Fourier transform process to be applied to digitized data generated from received signals, a frequency within the at least one user-defined policy, a power associated with a frequency within the at least one user-defined policy, and a control value for controlling combination of data within the at least one user-defined policy.

6. A network according to claim 1 wherein, the at least one signal analyzer provides spectral analysis of the at least one user-specified frequency band at least one of periodically as the signal analyzer cycles through the plurality of user-specified frequency bands.

7. A network according to claim 1 wherein, compliance of the received signal to the at least one user-defined policy is determined when a measure of the received signal meets predetermined conditions with respect to a plurality of thresholds, the predefined thresholds being established by the at least one user-defined policy.

8. A network according to claim 1 wherein, when the at least one user-defined policy contains a predetermined term to establish the policy for a frequency within the at least one user-defined frequency band that frequency result shall not be used in determining compliance to the at least one user-defined policy.

9. A network according to claim 1 wherein, the least one user-defined policy contains data to establish whether the received signals are compliant to the at least one user-defined policy, the data relating to at least a predetermined portion of each user-defined frequency band of the plurality of user-defined frequency bands.

10. A network according to claim 1 wherein, the trigger signal is generated by the at least one signal analyzer upon failure of at least a single measurement performed on the received signals within the at least one user-defined frequency band to meet the conditions established by the at least one user-defined policy.

11. A network according to claim 1 wherein, the trigger signal is generated by the at least one signal analyzer upon failure of a statistical analysis performed upon measurements performed on the received signals within the at least one user-defined frequency band to meet the conditions established by the at least one user-defined policy, the statistical analysis performed upon a predetermined number of measurements relating to at least one predetermined frequency within the at least user-defined frequency band.

12. A network according to claim 1 wherein, the trigger signal comprises at least one of a predetermined number of measurements relating to the received signals failing compliance to the at least one user-specified policy, and data relating to a corrective action performed by an element of a wireless network the signal analyzer is analyzing signals from.

13. A network according to claim 1 wherein, the trigger signal comprises information relating to received signals not complying with the at least one user-defined policy, the information being at least one of time-domain data, digitized in-phase baseband signal data, digitized quadrature baseband signal data, frequency domain data, absolute value Fast-Fourier Transform data, complex Fast-Fourier Transform data, processed digitized in-phase baseband data and processed digitized quadrature baseband data.

14. A network according to claim 1 wherein, the trigger signal comprises at least one of processed time domain data and time domain data for processing by at least one of the at least one server and a network administration application.

15. A network according to claim 1 wherein, if spectral analysis upon the at least one user-defined frequency band determines compliance to the at least one user-defined policy then no data is transmitted to the at least one server and a message to the at least one server to indicate a status of the communication link between the signal analyzer and the at least one server.

16. A network according to claim 1 wherein, the signal analyzer performs signal processing upon the received signals prior to determining compliance to the at least one user-defined policy and generating the trigger signal comprising at least a predetermined portion of the processed received signals.

17. A network according to claim 1 wherein, the signal processing comprises at least one of digitizing, identifying, demodulating, frequency down-converting, applying a mathematical process, filtering, amplifying, and attenuating.

18. A network according to claim 1 wherein, each user-specified frequency band of the plurality of user-specified frequency bands represents the instantaneous monitoring bandwidth of the signal analyzer.

19. A network according to claim 1 wherein, the user-defined policy of a plurality of user-defined policies relates to a power mask applied to the full user-specified frequency band of the plurality of user-specified frequency band which represents the instantaneous monitoring bandwidth of the signal analyzer.

* * * * *